(12) United States Patent  (10) Patent No.: US 12,547,188 B2
Cheng et al.  (45) Date of Patent: Feb. 10, 2026

(54) RANDOM PATTERN MOWING

(71) Applicant: Computime Limited, Hong Kong (HK)

(72) Inventors: Chung Ming Cheng, Hong Kong (HK); Chi Lung Chan, Hong Kong (HK)

(73) Assignee: Computime Limited, Hong Kong (HK)

( * ) Notice: Subject to any disclaimer, the term of this patent is extended or adjusted under 35 U.S.C. 154(b) by 100 days.

(21) Appl. No.: 18/432,805

(22) Filed: Feb. 5, 2024

(65) Prior Publication Data

US 2024/0264609 A1  Aug. 8, 2024

Related U.S. Application Data

(60) Provisional application No. 63/483,018, filed on Feb. 3, 2023.

(51) Int. Cl.

| G05D 1/648 | (2024.01) |
|---|---|
| A01D 34/00 | (2006.01) |
| A01D 101/00 | (2006.01) |
| G05D 105/15 | (2024.01) |
| G05D 107/20 | (2024.01) |

(Continued)

(52) U.S. Cl.
CPC ........... G05D 1/648 (2024.01); *A01D 34/008* (2013.01); *G05D 1/6484* (2024.01); *A01D 2101/00* (2013.01); *G05D 2105/15* (2024.01); *G05D 2107/23* (2024.01); *G05D 2111/36* (2024.01); *G05D 2111/50* (2024.01); *G05D 2111/54* (2024.01)

(58) Field of Classification Search
CPC ...... G05D 1/648; G05D 1/2464; G05D 1/247; G05D 1/248; G05D 1/6484; G05D 2111/50; G05D 2111/36; G05D 2111/54; G05D 2105/15; G05D 2107/23; G05D 2109/10; A01D 34/008; A01D 2101/00

See application file for complete search history.

(56) References Cited

U.S. PATENT DOCUMENTS

| 2012/0029756 A1* | 2/2012 | Johnson | G05D 1/0265 |
| | | | 701/26 |
| 2022/0124973 A1* | 4/2022 | Juel | A01D 34/008 |
| 2023/0119277 A1* | 4/2023 | Leijonberger | A01D 34/008 |
| | | | 56/229 |

FOREIGN PATENT DOCUMENTS

| EP | 3589111 B1 * | 2/2022 | ........... A01D 34/008 |
| EP | 4137907 A1 * | 2/2023 | ........... A01D 34/008 |

* cited by examiner

*Primary Examiner* — Michael J Zanelli
(74) *Attorney, Agent, or Firm* — Kasha Law LLC; John Kasha; Kelly Kasha

(57) ABSTRACT

A lawnmower is instructed to move from a reference point along the boundary wire and to follow the boundary wire along a boundary path back to the reference point, using data from at least one wire sensor of the lawnmower. One or more elements are determined along the boundary path using distance data from at least one distance sensor of the lawnmower and using angular velocity data from at least one direction sensor of the lawnmower. The one or more elements are identified as one of at least three different types of elements. The mowing area is calculated from the identified types of the one or more elements and the distance data and angular velocity data received for the one or more elements. Other important features are obtained from the calculation of the mowing area including, but not limited to, multiple starting points and a parallel mowing pattern.

16 Claims, 38 Drawing Sheets

(51) Int. Cl.
*G05D 111/30* (2024.01)
*G05D 111/50* (2024.01)

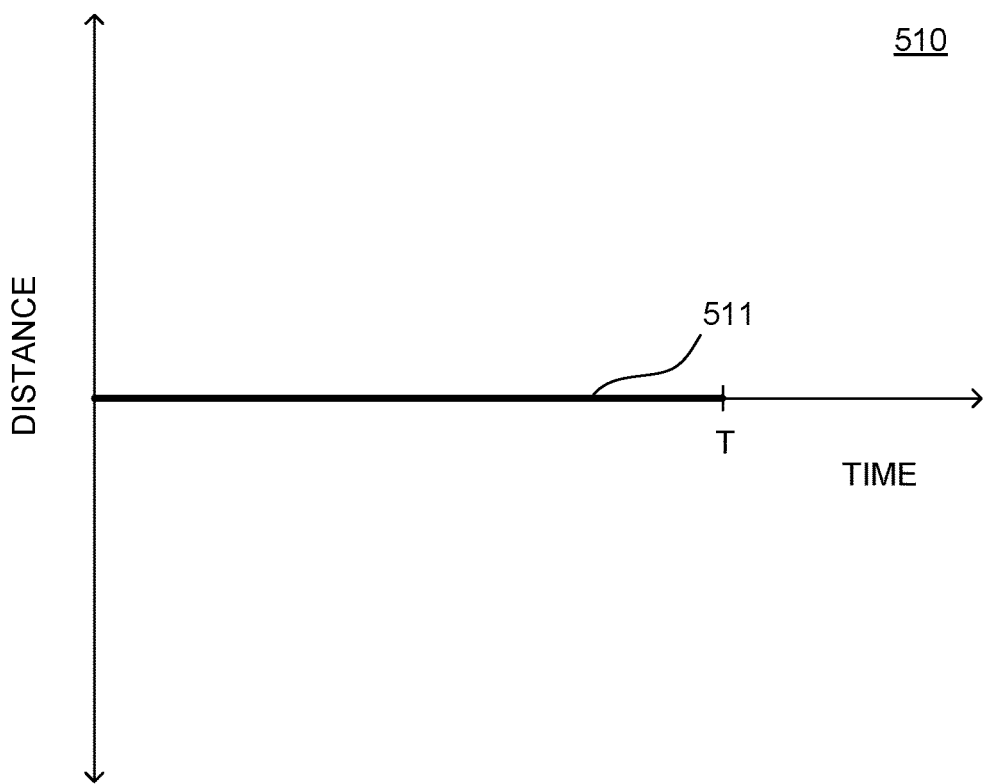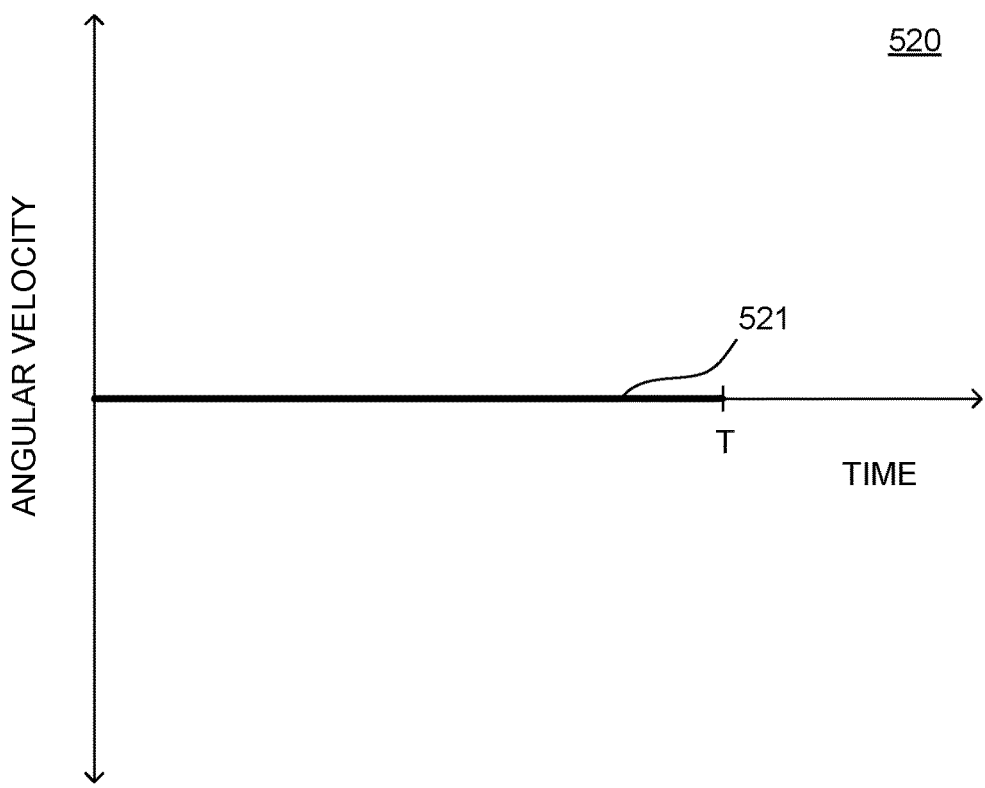
FIG. 5

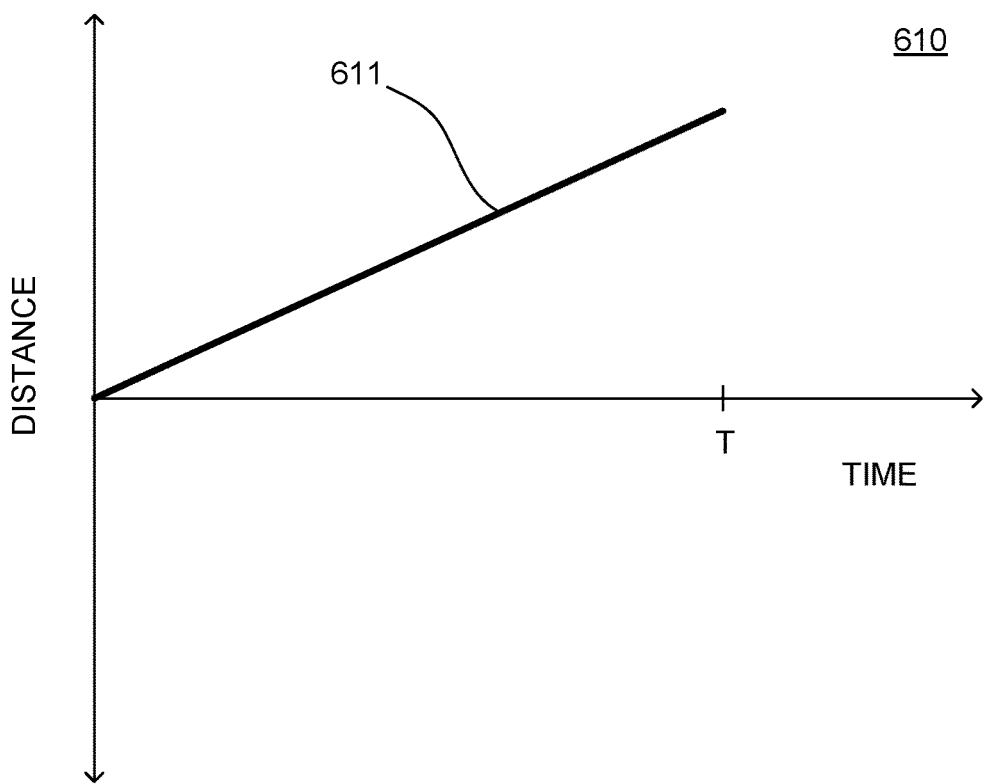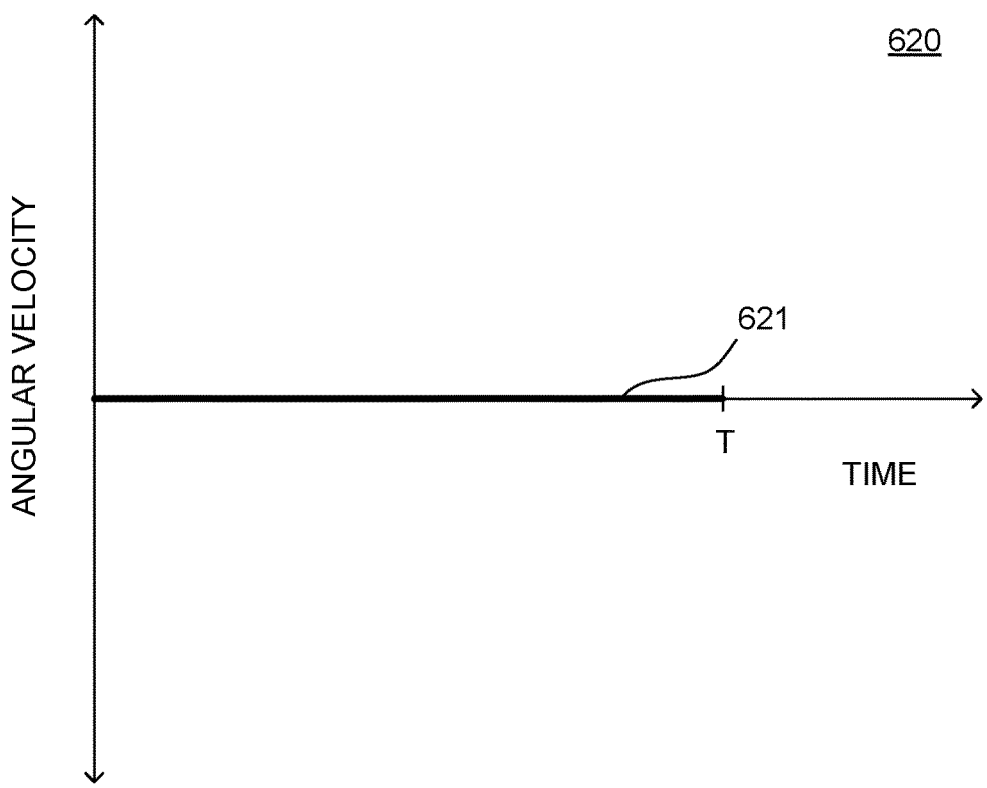
FIG. 6

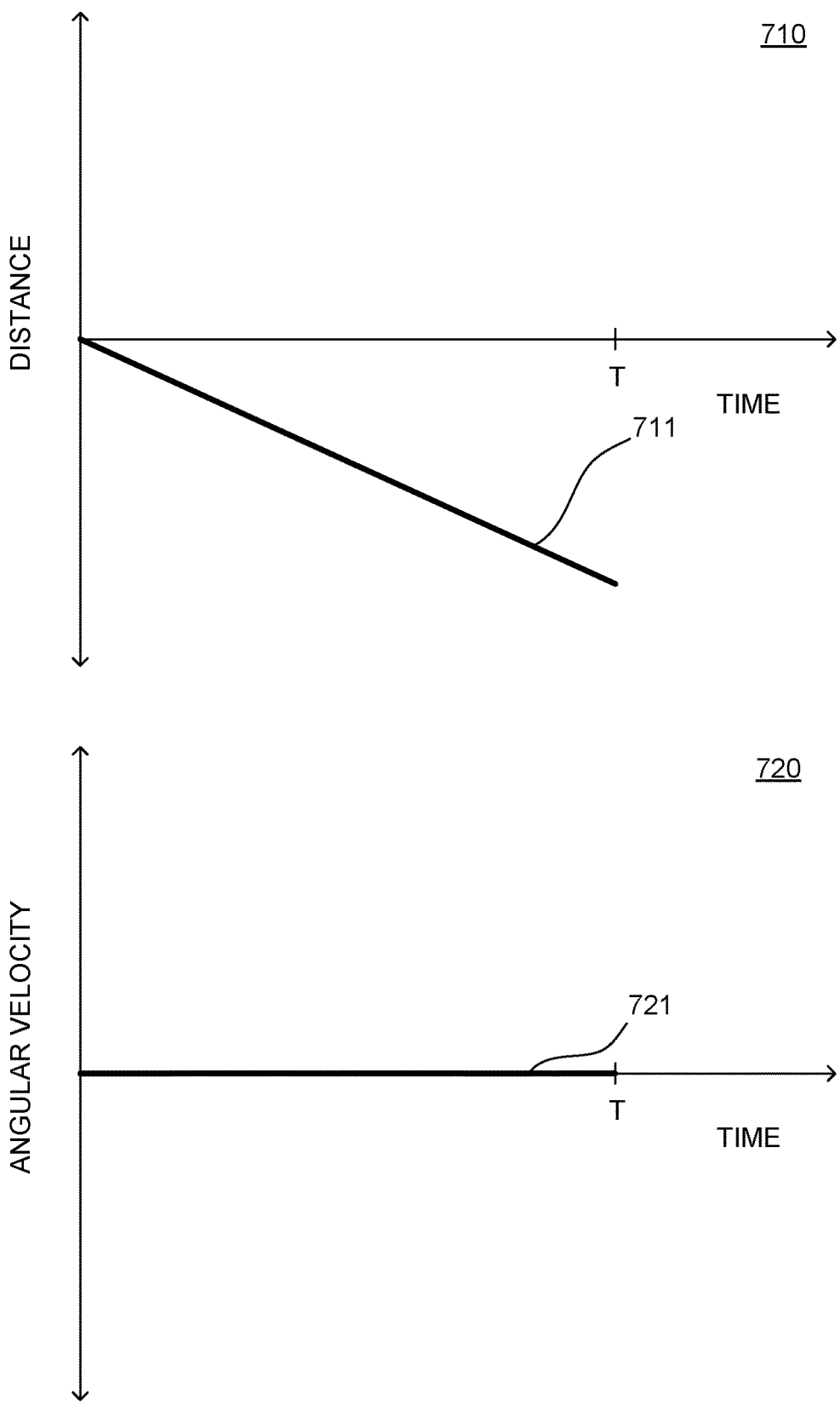
FIG. 7

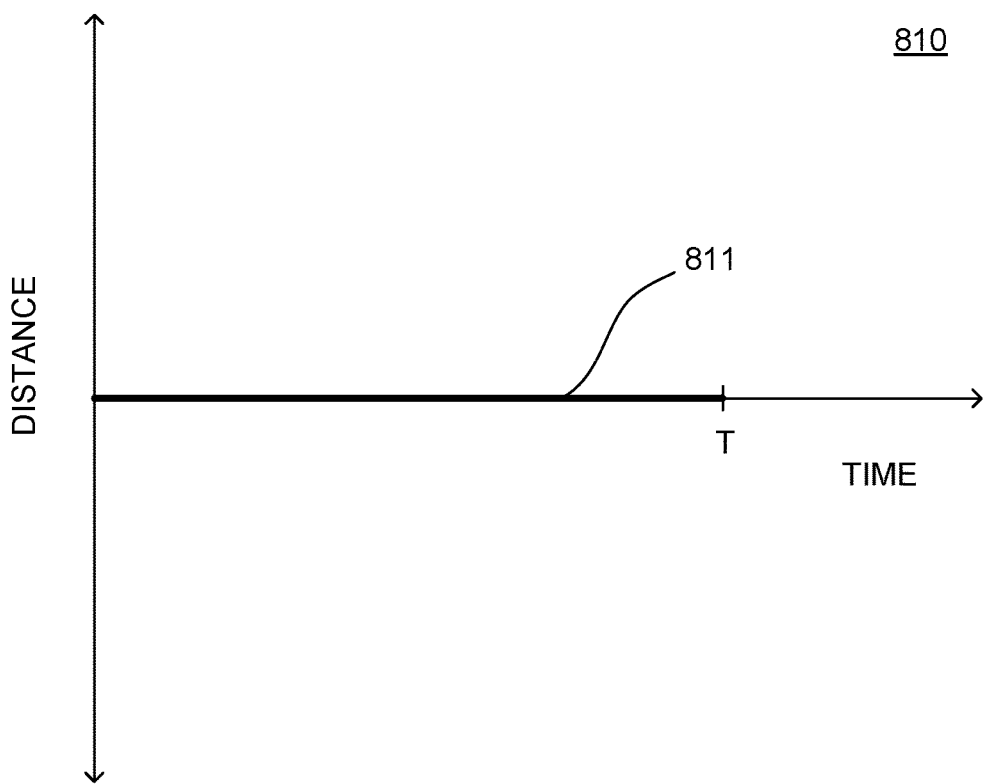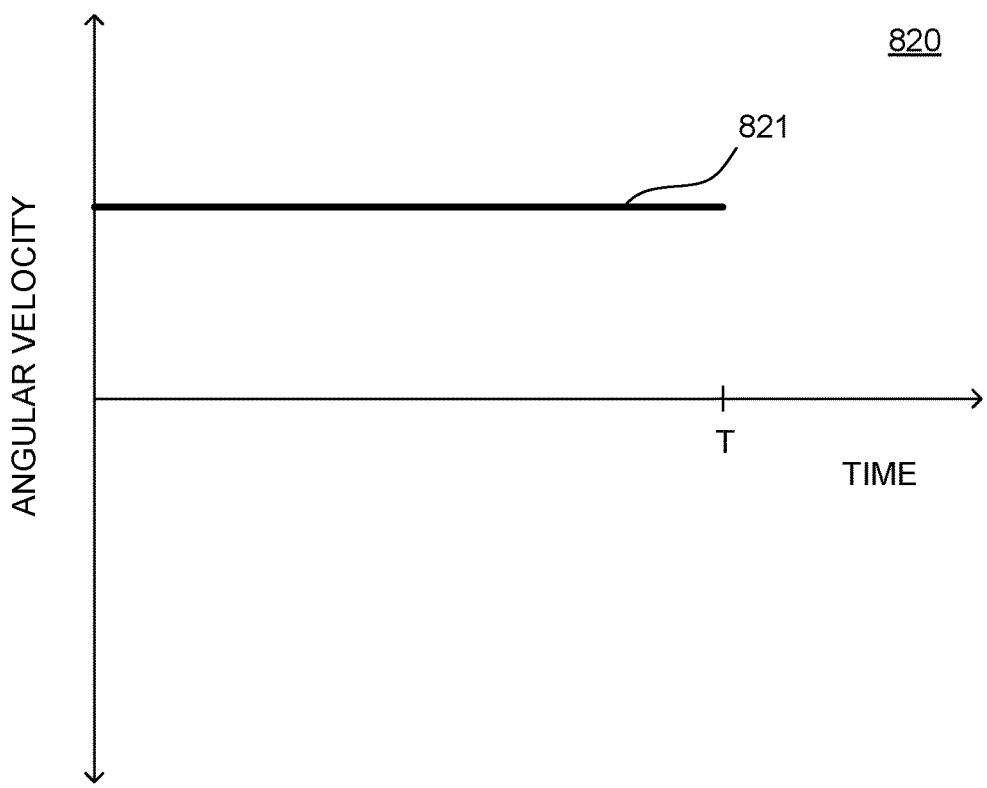
FIG. 8

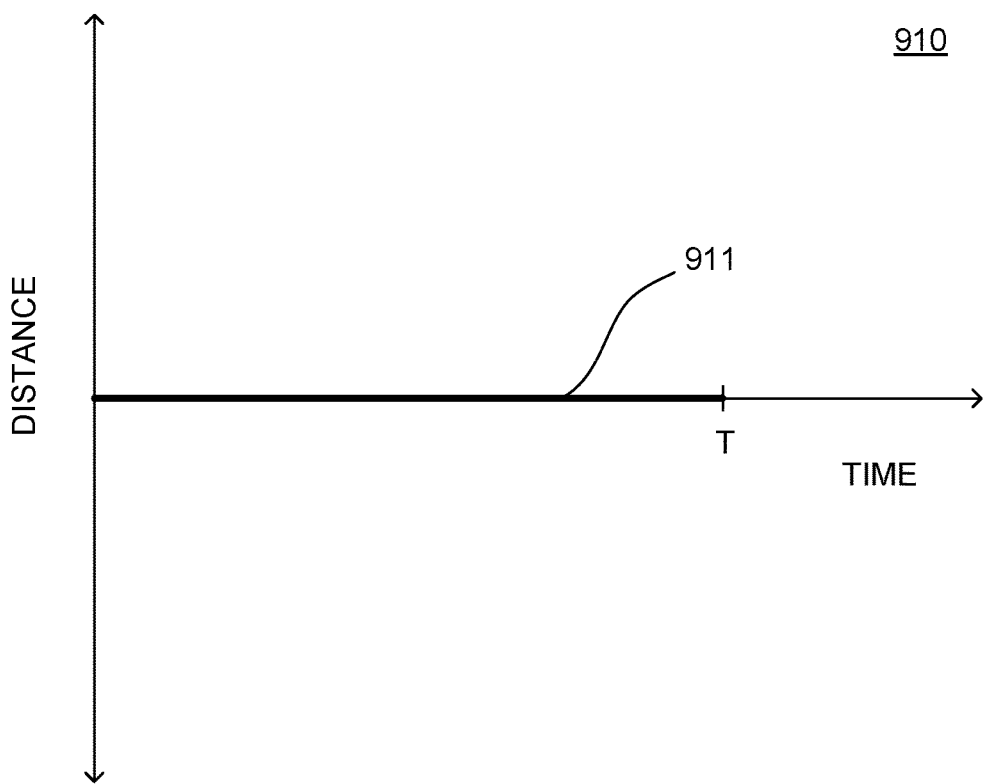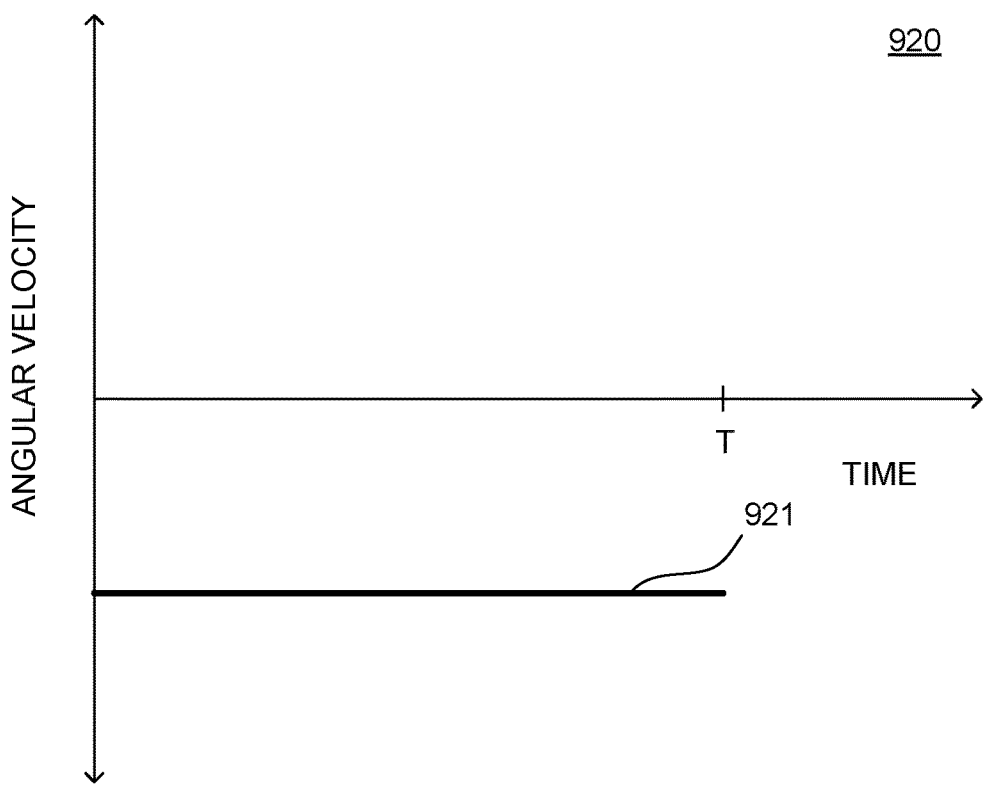
FIG. 9

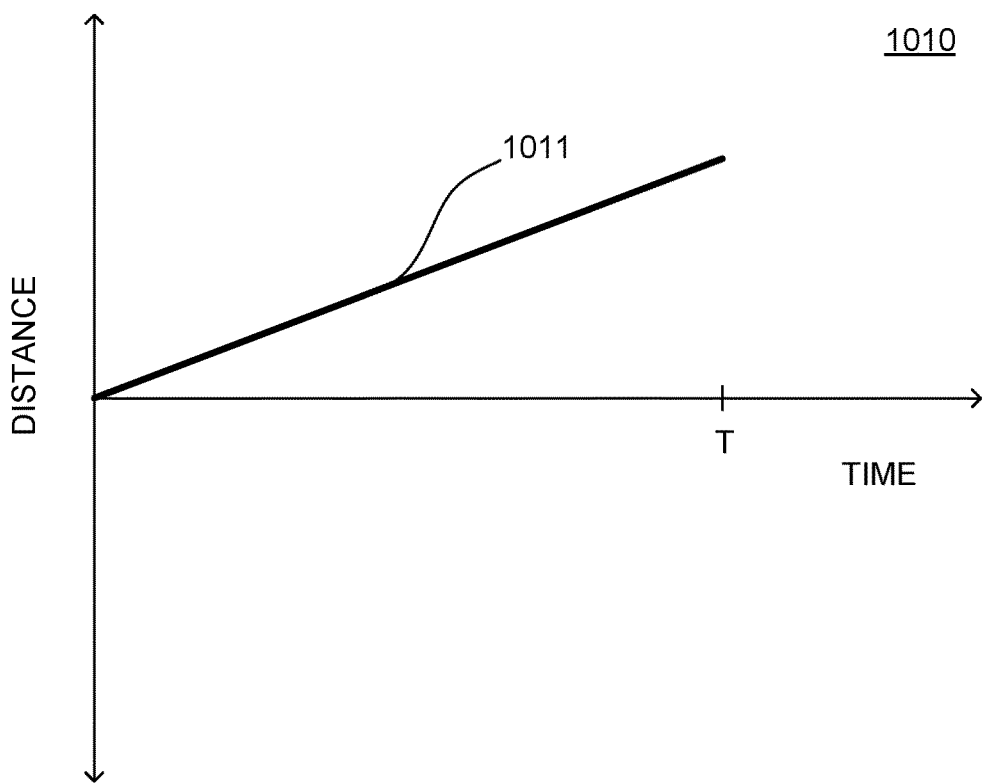
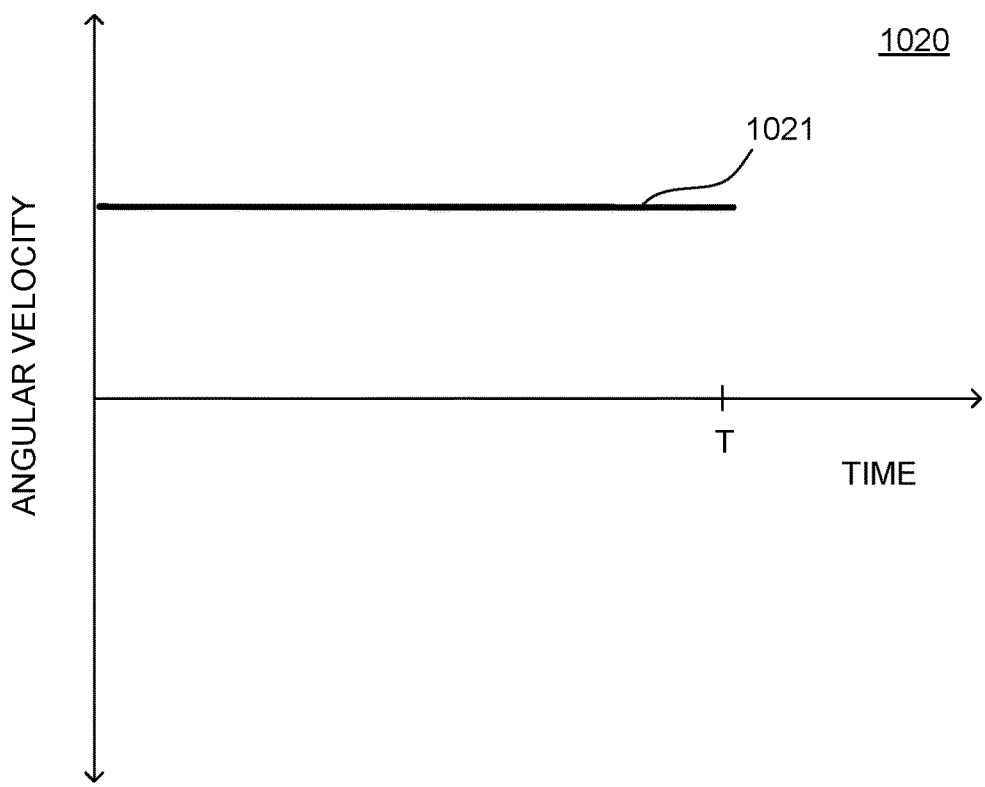
FIG. 10

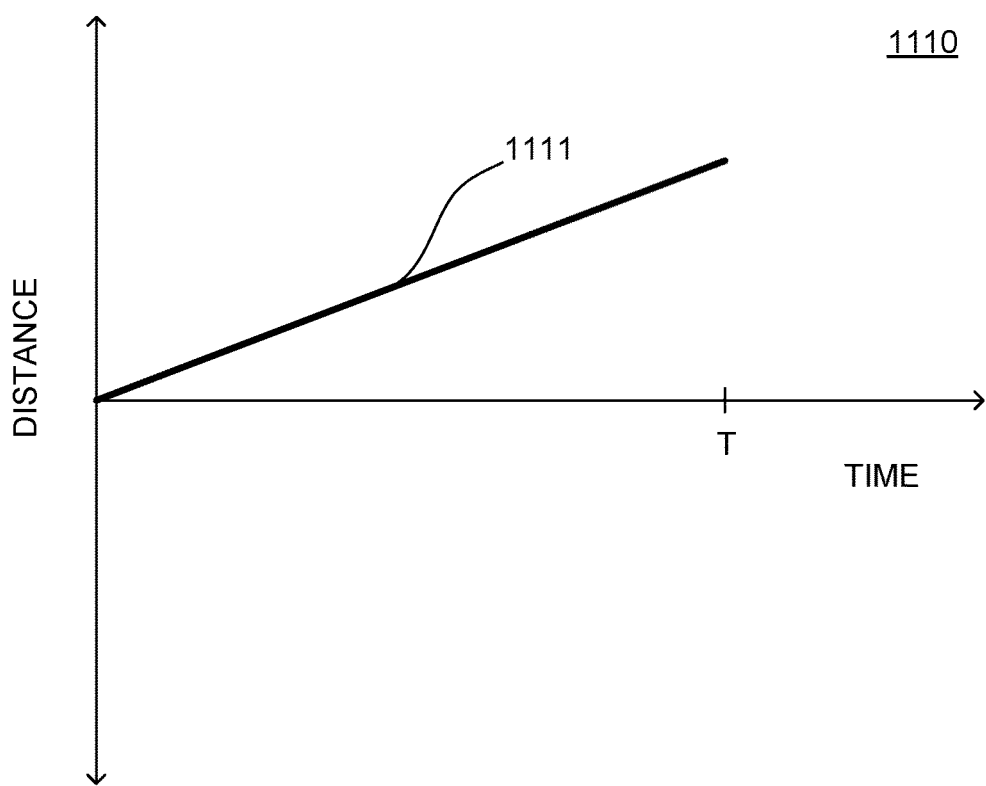
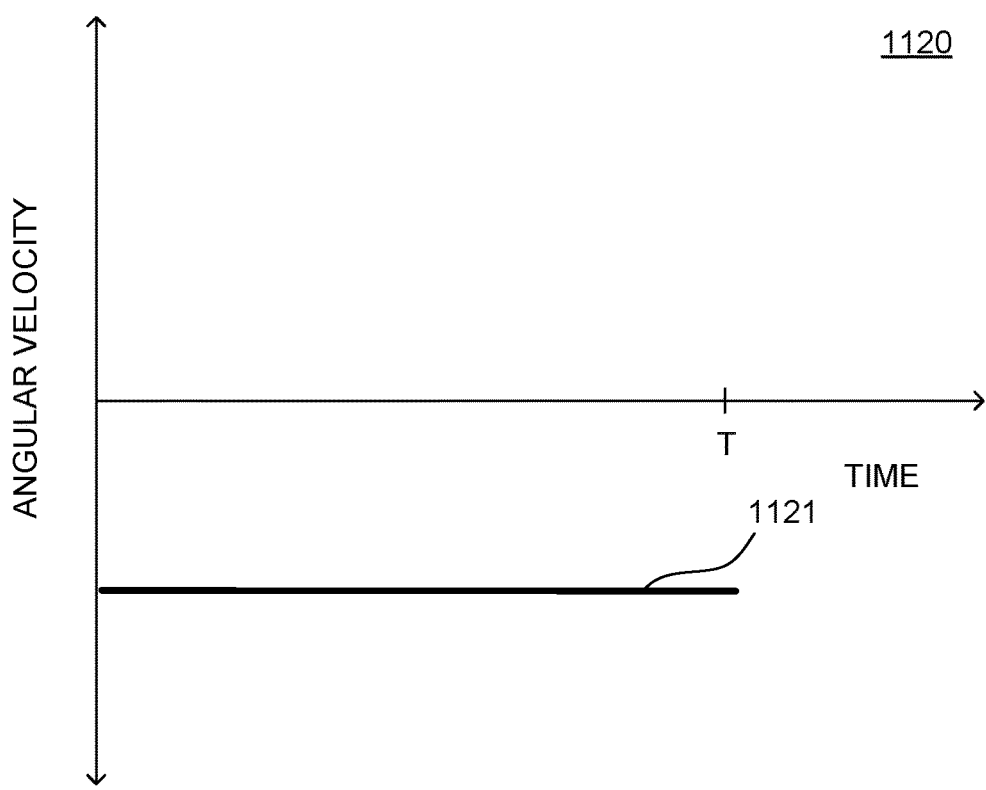
FIG. 11

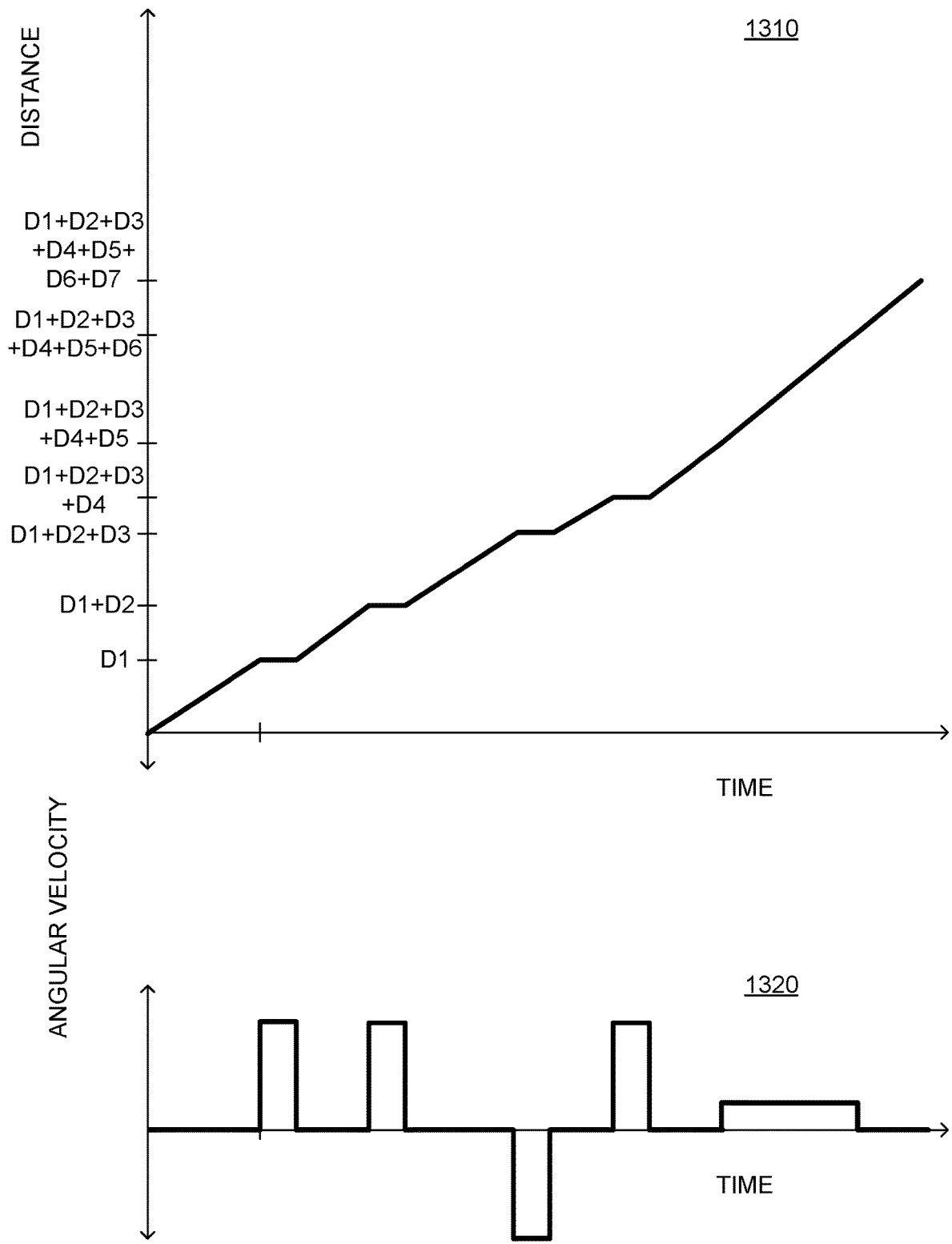
FIG. 13

| ELEMENT | ELEMENT TYPE | DISTANCE AND/OR ANGLE |
|---|---|---|
| E1 | LINE | D1 |
| E2 | NODE | +90° |
| E3 | LINE | D2 |
| E4 | NODE | +90° |
| E5 | LINE | D3 |
| E6 | NODE | -90° |
| E7 | LINE | D4 |
| E8 | NODE | +90° |
| E9 | LINE | D5 |
| E10 | CURVE | D6, +180° |
| E11 | LINE | D7 |

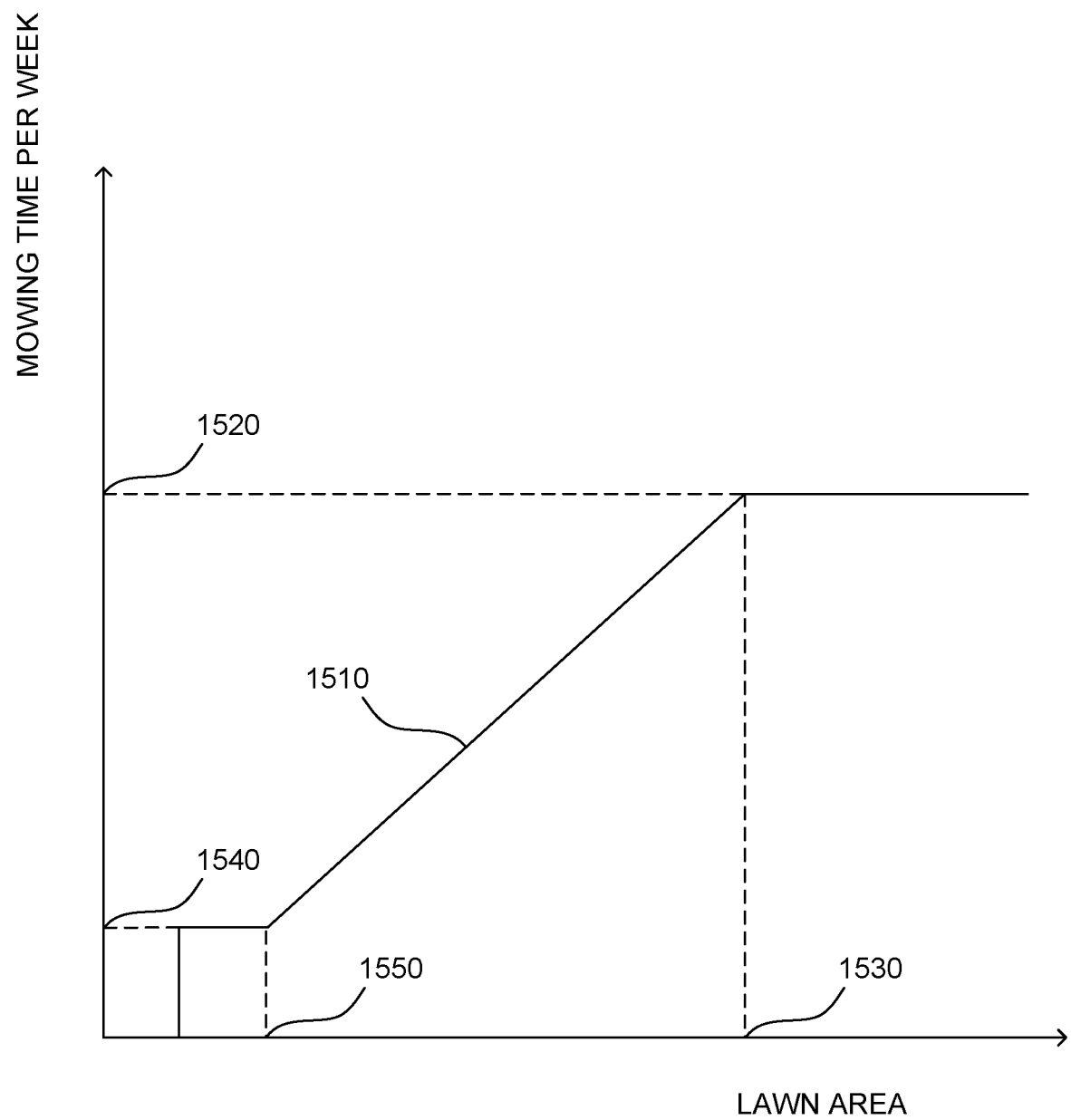
FIG. 15

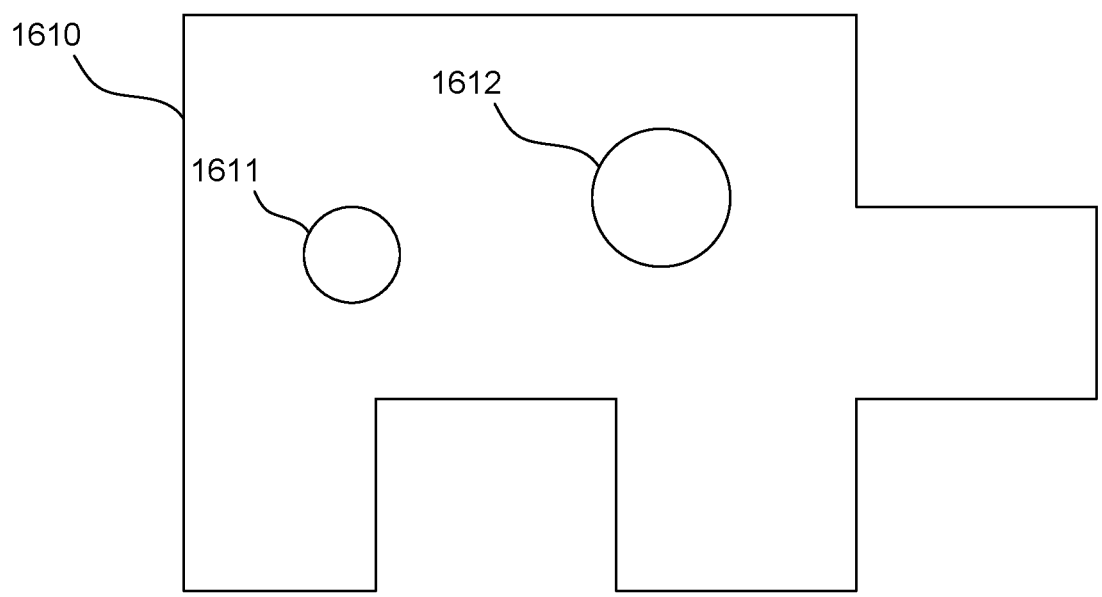
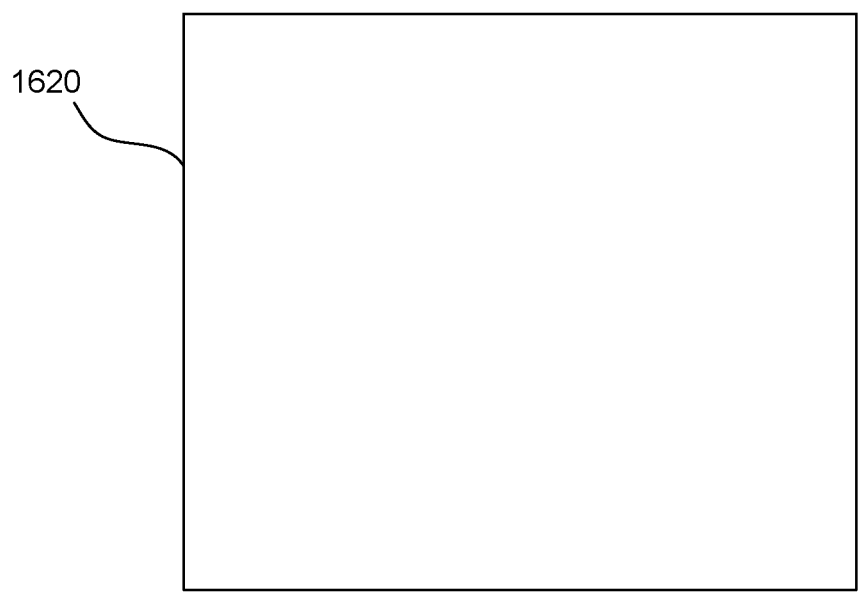
FIG. 16

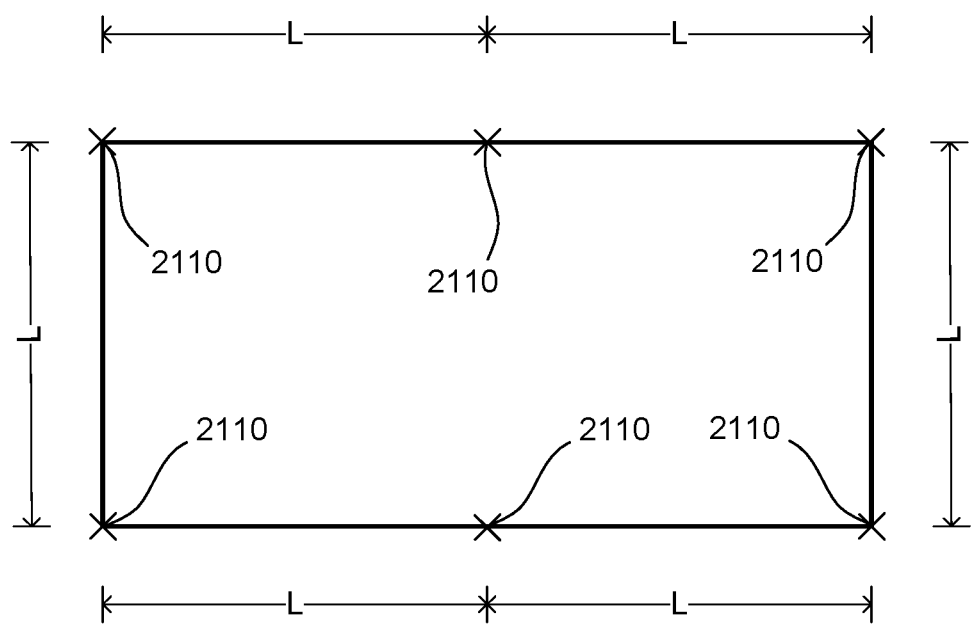
FIG. 21

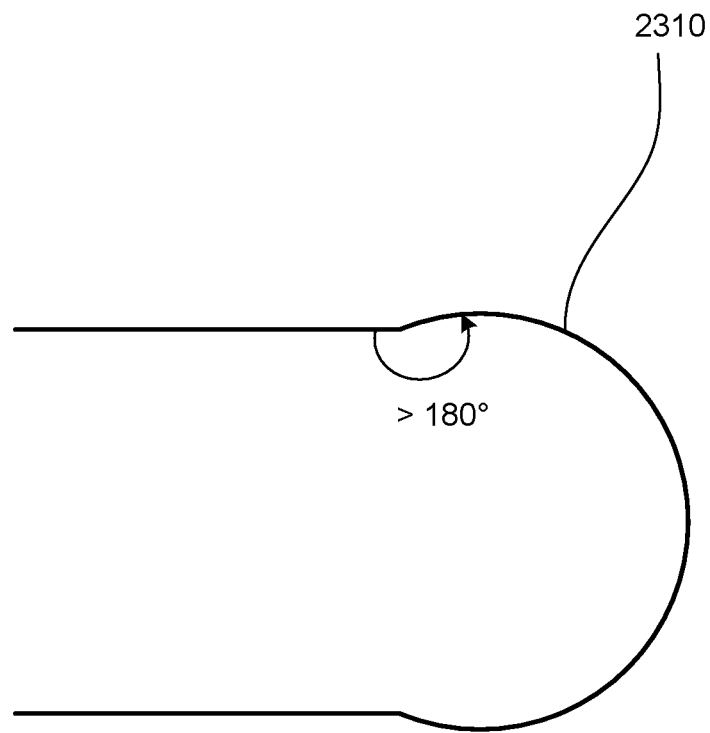
FIG. 23

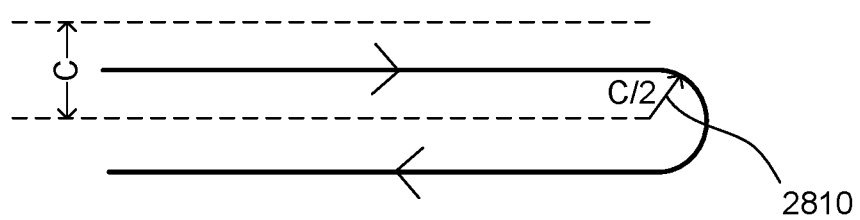
FIG. 28

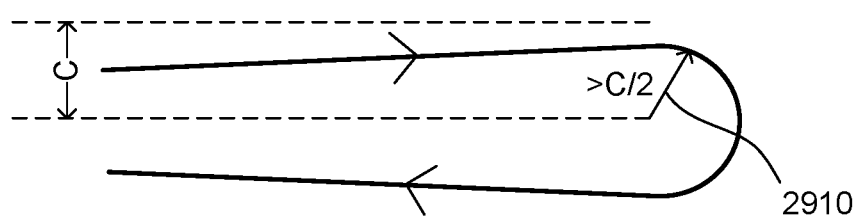
FIG. 29

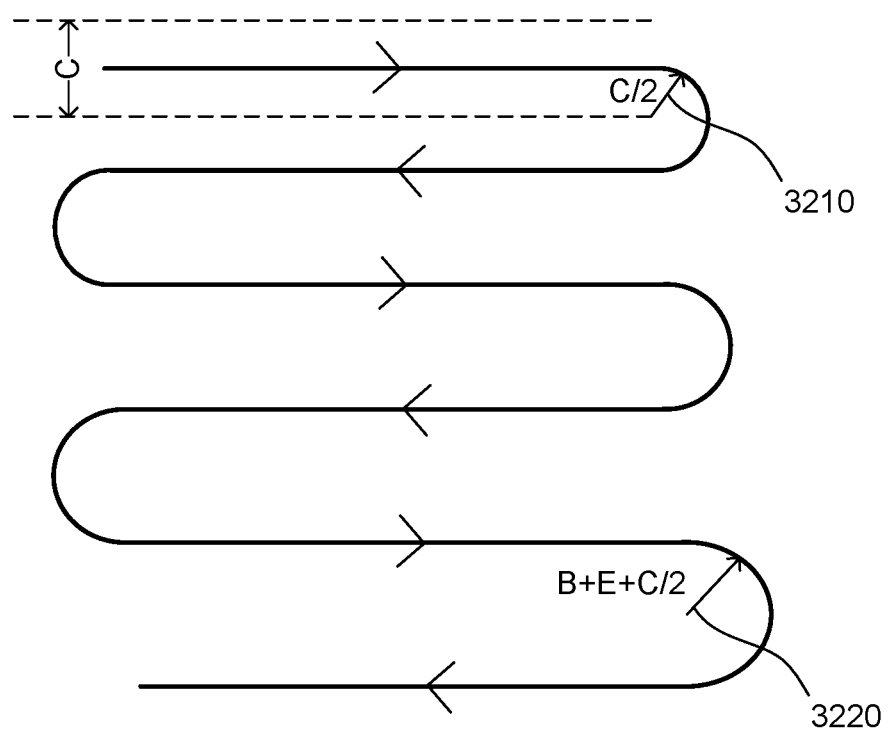
FIG. 32

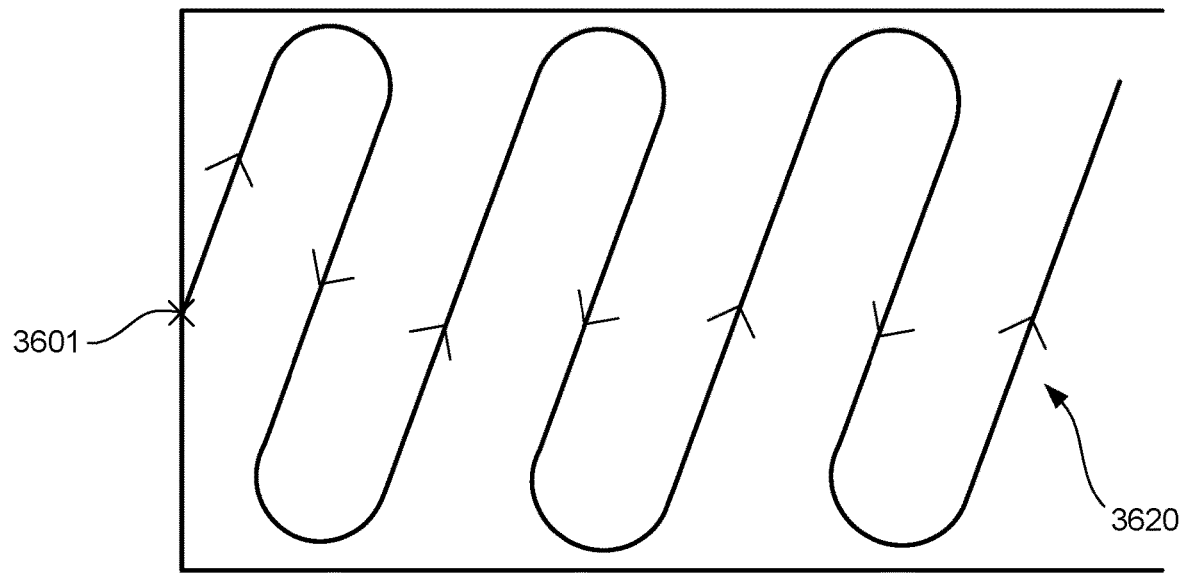
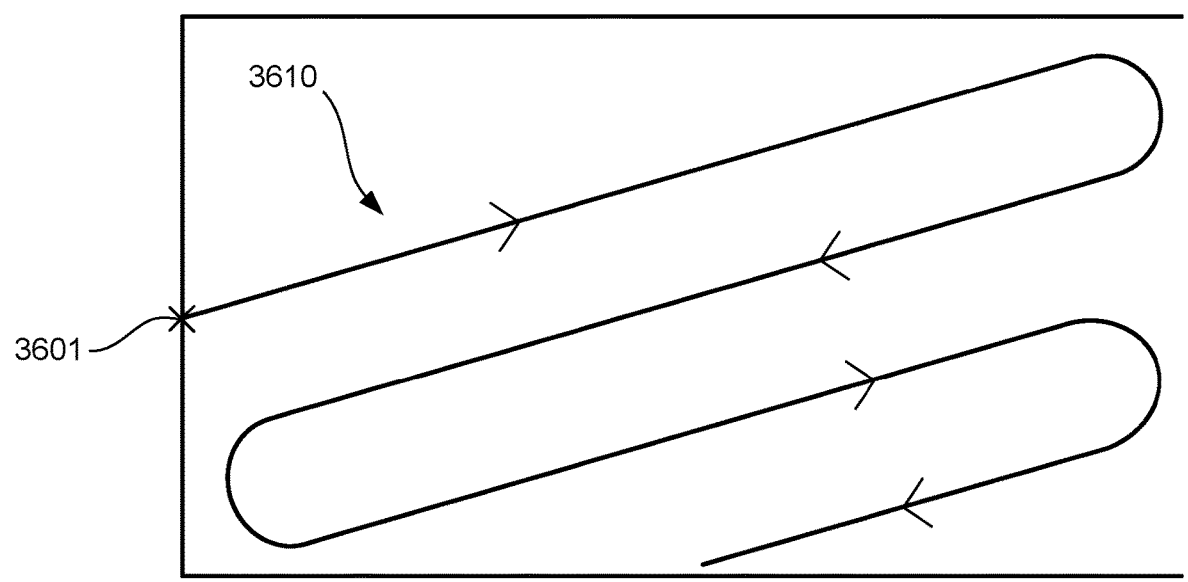
FIG. 36

RANDOM PATTERN MOWING

RELATED APPLICATIONS

This application claims the benefit of U.S. Provisional Patent Application Ser. No. 63/483,018, filed on Feb. 3, 2023, the content of which is incorporated by reference herein in its entirety.

FIELD OF THE INVENTION

The teachings herein relate to autonomous lawnmowers and the navigation and mowing strategy of autonomous lawnmowers. More particularly the teachings herein relate to apparatus and methods for calculating a mowing area of a lawn delimited by a boundary wire.

The systems and methods herein can be performed in conjunction with a processor, controller, or computer system, such as the computer system of FIG. 1.

BACKGROUND

Using boundary wire is a widely used method to define the mowing area for autonomous lawnmowers. The boundary wire is a wire loop that surrounds the area to be mowed. The wire loop is connected to a docking station that generates an electric signal. The mower has sensors to detect this signal to determine if it is inside or outside of the wire loop. Mowing starts inside the wire loop. The mower moves forward and if it reaches the wire, it will detect the state changes from inside to outside. The mower will then stop and change direction randomly and continue mowing. The mower will repeat this hit-and-turn process (the random path method) and, with enough repetition, the lawn should be mowed properly.

The mower can also track the boundary wire to guide it back to the docking station to charge the battery. The mower usually has two or more of these boundary wire sensors to increase the tracking accuracy. This method is simple and reliable but lacks coverage efficiency, and, for lawns with multiple zones, it would require extra guidance such as a guide wire to lead the mower to different zones.

The coverage efficiency is the time the mower takes to cover a specific percentage of the total mowing area. The shorter the time it takes, the higher the efficiency. The random path method is not a very good solution in terms of high coverage efficiency. The paths are chosen randomly without any attempt to reduce overlapping with previous paths. While it is possible to cover every inch of the mowing area with random paths in a given long period of time, there could be many overlapping paths. Overlapping paths lower the efficiency of coverage.

For a lawn that has multiple areas or zones connected by narrow passages, to go from one zone to another, the mower has to pass through the passages. In the random path method, the mower's path is chosen randomly and the chance it can reach the passage entrance and go to another end is low. In this situation, a guide wire is usually required. When the mower detects the guide wire, it will suspend the random path and follow the guide wire, usually leading it to another zone or back to the docking station for charging.

To increase the coverage efficiency and solve the multi-zone problem, some have proposed using high-precision navigation systems such as RTK real-time kinematic (RTK) global positioning system (GPS), beaconing, or visual simultaneous localization and mapping (SLAM). Instead of using boundary wire to define the mowing area, the mowing area (the map) is first input to the mower manually or automatically. An efficient mowing path can then be pre-calculated based on the map. With the high-precision navigation system, the mower can follow the path precisely to finish the mowing job. The drawback is that high-precision navigation usually requires high-cost components and/or is complex to set up, and in the case of visual SLAM, reliability is also a concern. These make it not commonly used in household robotic lawnmowers.

As a result, there is an unmet need for systems and methods that improve coverage efficiency over the typical random path method and eliminate the need for additional guide wires in a complex lawn layout.

BRIEF DESCRIPTION OF THE DRAWINGS

The skilled artisan will understand that the drawings, described below, are for illustration purposes only. The drawings are not intended to limit the scope of the present teachings in any way.

FIG. 5 is an exemplary diagram showing plots of distance versus time and angular velocity versus time that depict exemplary odometer data and gyroscope data, respectively, when the lawnmower is stationary, in accordance with various embodiments.

FIG. 6 is an exemplary diagram showing plots of distance versus time and angular velocity versus time that depict exemplary odometer data and gyroscope data, respectively, when the lawnmower is moving forward at a constant speed, in accordance with various embodiments.

FIG. 7 is an exemplary diagram showing plots of distance versus time and angular velocity versus time that depict exemplary odometer data and gyroscope data, respectively, when the lawnmower is moving backward at a constant speed, in accordance with various embodiments.

FIG. 8 is an exemplary diagram showing plots of distance versus time and angular velocity versus time that depict exemplary odometer data and gyroscope data, respectively, when the lawnmower is pirouetting left at a constant angular velocity, in accordance with various embodiments.

FIG. 9 is an exemplary diagram showing plots of distance versus time and angular velocity versus time that depict exemplary odometer data and gyroscope data, respectively, when the lawnmower is pirouetting right at a constant angular velocity, in accordance with various embodiments.

FIG. 10 is an exemplary diagram showing plots of distance versus time and angular velocity versus time that depict exemplary odometer data and gyroscope data, respectively, when the lawnmower is turning left at a constant speed and constant turning rate, in accordance with various embodiments.

FIG. 11 is an exemplary diagram showing plots of distance versus time and angular velocity versus time that depict exemplary odometer data and gyroscope data, respectively, when the lawnmower is turning right at a constant speed and constant turning rate, in accordance with various embodiments.

FIG. 13 is an exemplary diagram showing plots of distance versus time and angular velocity versus time that depict exemplary odometer data and gyroscope data, respectively when the lawnmower of FIG. 12 follows the boundary of FIG. 12, in accordance with various embodiments.

FIG. 15 is an exemplary plot showing the relationship between the mowing time per week and the lawn area, in accordance with various embodiments.

FIG. 16 is an exemplary diagram showing how the complexity of the lawn layout can affect the mowing time, in accordance with various embodiments.

FIG. 21 is an exemplary diagram showing starting points that are equidistant from each other, in accordance with various embodiments.

FIG. 23 is an exemplary diagram showing a curved boundary that has an angle change greater than 180°, in accordance with various embodiments.

FIG. 28 is an exemplary diagram showing the relationship between track overlapping and cutting width of the lawnmower, in accordance with various embodiments.

FIG. 29 is an exemplary diagram showing an increased turn radius in order to avoid track overlapping, in accordance with various embodiments.

FIG. 32 is an exemplary diagram showing how a turn radius gradually increases over time, in accordance with various embodiments.

FIG. 36 is an exemplary diagram 3600 showing two pattern orientations for the same piece of lawn that has a long and narrow geometry, in accordance with various embodiments.

Figure 1:
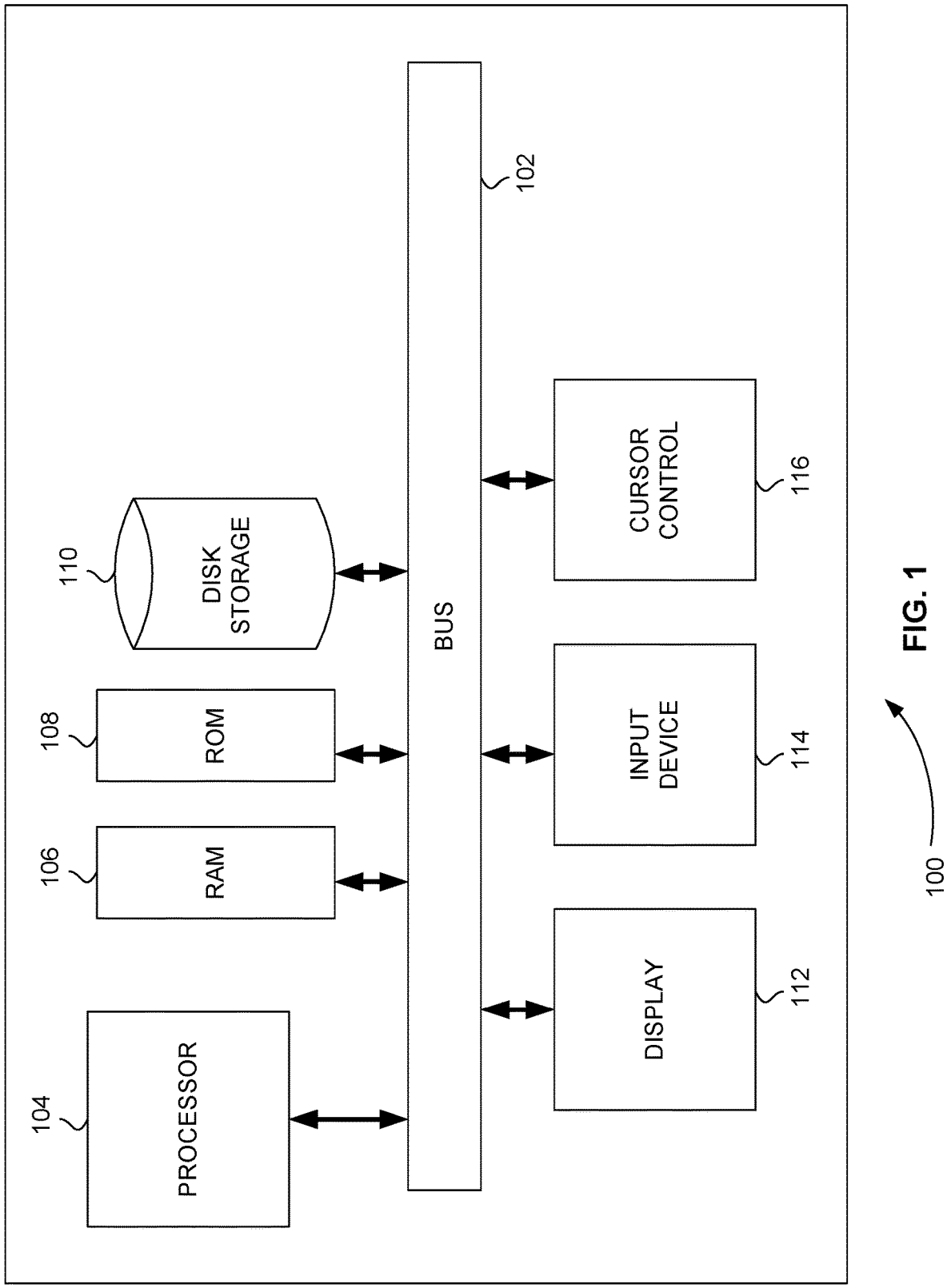
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random-access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein.

Alternatively, hard-wired circuitry may be used in place of or in combination with software instructions to implement the present teachings. For example, the present teachings may also be implemented with programmable artificial intelligence (AI) chips with only the encoder neural network programmed—to allow for performance and decreased cost. Thus, implementations of the present teachings are not limited to any specific combination of hardware circuitry and software.

The term "computer-readable medium" or "computer program product" as used herein refers to any media that participates in providing instructions to processor 104 for execution. The terms "computer-readable medium" and "computer program product" are used interchangeably throughout this written description. Such a medium may take many forms, including but not limited to, non-volatile media and volatile media. Non-volatile media includes, for example, optical or magnetic disks, such as storage device 110. Volatile media includes dynamic memory, such as memory 106.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Lawn Mowing System and Method

In various embodiments, coverage efficiency is improved over the typical random path method and the need for guide wires in a complex lawn layout is eliminated. In these embodiments, a typical boundary wire design is employed with the addition of low-cost navigation references. These low-cost navigation references can include, but are not limited to, a gyroscope, an odometer, and a software algorithm. Other distance measurement references such as a tachometer on the wheel or GPS are also options. Similarly, for the directional reference, other devices such as a compass and a GPS device can also be used.

In various embodiments, a boundary wire is used to define the mowing area. The ends of the boundary wire are connected to the docking station to form a loop. The docking station generates an electrical signal for the mower to detect the wire. By detecting the signal, the mower can determine if it is inside or outside of the boundary. It can also follow the boundary wire to go around the boundary and go back to the docking station.

The mower includes, for example, an odometer that counts the number of turns of the wheels, which can convert into the distance traveled by multiplying it by the circumference of the wheel. The mower also includes a gyroscope that detects the turning rate of the mower, and, by integrating the turning rate, the total direction change is obtained.

In various embodiments, a reference point is selected on the boundary, which is usually the docking station. Starting from the reference point, the mower follows the boundary wire and uses the odometer and gyroscope to measure and record the distance and direction change along the route.

The changes in distances and directions build up the characteristics of the boundary and are recorded as a list of three basic elements: Line, Curve, and Node. A line has a very small directional change for a relatively long distance. A curve is a monotonic and continuous directional change of a path. A node is an abrupt change of direction.

A line is described by the distance (D) traveled along the boundary wire between the start and endpoints. A curve is described by the distance (D) traveled along the boundary wire between the start and end points, and the total direction change (C) throughout the curve. A node is described by the turning angle (A) of the mower. Distances (D) are always positive. The direction change of curve (C) is positive if the mower turns counter-clockwise, and negative if counter-clockwise.

For nodes, the turning angle (A) is positive if the angle of the heading is increasing (turning counter-clockwise), and negative if decreasing. Turning angle (A) should be within the range of +/−180 degrees. The mower always runs the wire in the same direction, either clockwise or counter-clockwise, so that it can recognize the boundary characteristics correctly in later runs. This process can be repeated so abnormalities are averaged out. Note that both the odometer and the gyroscope are not a very good navigation reference. They are the type of dead reckoning navigation that error accumulates and is not corrected throughout the course. Secondly, modeling the boundary by only lines, curves, and nodes is oversimplified.

So boundary acquisition of the above method is not intended to draw a map of the lawn accurately. The method gives the mower a general idea of the size and shape of the lawn, so mowing sessions afterward can be planned based on it. More importantly, if the same control procedure that drives the mower during the acquisition process is used to drive the mower on the wire again, boundary characteristics very similar to those recorded are measured. Comparing the two measurements, the mower can reliably determine which part of the boundary it is in.

For example, if the mower needs to go to a location on the boundary that is 50 m from the reference point, using only the odometer as a reference to go to the location, the distance error will accumulate along the 50 m path. If boundary acquisition was performed before and the location is found equivalent to 3 nodes and then a 5 m run, the mower can repeat the procedure and after 3 nodes have been passed, it only needs to run another 5 m. The error accumulation is then only on the final 5 m path, which is much smaller than the previous 50 m path.

Unlike traditional lawnmowers that can complete a mowing job in one pass, autonomous lawnmowers are usually much smaller in size and are equipped with small cutting blades that have a cutting rate that is a lot slower, so they usually need to mow the lawn repeatedly for a longer time. Depending on the size of the lawn, the mowing time ranges from one or two hours a day to mowing continuously throughout the day.

Due to the limited battery capacity, usually about one hour, the mower needs to go back to the docking station to recharge the battery periodically, so there are several charge-mow cycles. With the typical random path method, each mowing session (a charge-mow cycle) is a brand new start from the docking station and purely relies on the random selection of the paths and makes no reference to the previous sessions and/or the characteristics of the lawn. For certain lawn layouts, this may favor locations that are easier to reach while leaving some areas less visited, resulting in uneven mowing. In various embodiments, the mower can go to any designated part of the boundary by following the boundary wire.

Factors such as the total boundary distance, the complexity of the shape of the lawn, and the mowing history are then taken into account to set up a plan of mowing that covers several mowing sessions. Each session is characterized by a specific starting point on the boundary.

For example, it can set up several starting points evenly along the boundary so that the mower can effectively go to different parts of the lawn. Also, a node usually denotes a corner of the lawn. Setting up a starting point on a node can effectively cover the area around the corner. If some parts of the lawn have a complex boundary, which is characterized by a relatively large number of boundary elements within a small distance, or, if based on mowing history the mower found that it can easily come to obstacles when starting from certain starting points, both indicate a complex layout and the chance that the mower could have missed some areas is higher. It can then increase the density of the starting points there so the mower will visit there more often.

A curved boundary is a large piece of area that does not have a corner or node and is denoted by only one element. It is featureless. Despite this, it is possible to estimate the characteristics of the area. A curve element includes a distance along the curve (D) and the direction change between the start and end point (C). Assume even curvature and counter-clockwise boundary run, if C is +180 degrees, it denotes a semicircle enclosing the lawn. If C is positive and less than 180, the area enclosed is small and can be simply treated as a straight boundary. If C is positive and larger than +180, it is probable that the curve element indicates another zone of the lawn with a small entrance. The mower can then place starting points along the curve to avoid missing the area. If C is negative, it denotes a curved boundary open to a larger area, which usually does not need to be handled specifically.

In various embodiments, a random factor is also added so that the same starting point of different mowing sessions is displaced a little from each other. This added randomness can prevent mowing on the same spot repeatedly, and reduce the possibility of missing some spots if using pattern mowing, which is discussed later.

In general, a lawn with a larger area takes a longer time each day to mow. Using the acquired boundary characteristics (lines, curves, and nodes), it is possible for the mower to estimate the area of the lawn and automatically determine an optimum mowing time. One possible method to estimate the area is to count the number of unit areas bounded by the boundary. For example, if the mower acquires the boundary characteristics by running counterclockwise along the boundary, then the lawn is always on the left side of the mower. Assuming a two-dimensional memory array is a "virtual lawn," and each memory cell is one unit area, based on the acquired boundary characteristics and repeating the route in the virtual lawn, the memory cells on the route are flagged as the boundary. Repeating the route and flagging all the memory cells on the "left" of the route until another boundary cell, then the total number of the flagged memory cells is the estimated area.

In addition to the area, a boundary characteristic that includes more elements usually means a more complex shape than the one with less. A lawn with a complex boundary shape usually takes more time for the mower to maneuver. With the estimated lawn area and lawn complexity, the mower can automatically determine a daily mowing time for the lawn.

With the above-mentioned methods, the mower can set up a mowing plan that includes multiple mowing sessions, each with different starting points on the boundary. To enhance the effectiveness of the strategically placed starting points, the mower mows around the starting locations for a certain minimum area or a certain minimum period of time before changing to normal random mowing. A simple method is to mow the lawn around the starting point row by row to cover a certain area using a parallel mowing pattern.

In various embodiments, the mower uses the gyroscope to keep it on a straight line and the odometer to measure the distance traveled. Each row can be terminated by obstacles, a boundary, or when a predefined distance is reached. When one row is completed, the mower turns around 180 degrees based on the gyroscope and starts a new row. The distance between two rows defines how much overlapping is performed. It is ideal that there is neither overlapping nor a gap between rows so that the coverage efficiency is at the highest. This can be achieved by simply setting the turning radius to half of the cutting width (row width) of the mower.

While the method looks simple, this type of "pattern mowing" is not easy to achieve with simple and low-cost navigation references, such as odometer and gyroscope. For these types of sensors, errors accumulate along the course. The longer the time and/or distance, the higher the chance that the mower will deviate from the designated course.

The distance error from the odometer is not critical to the pattern so it can be ignored. On the other hand, directional error could lead to overlapping of the rows, causing the rows to stack together. This causes the mower to repeat mowing over a small region and make small or no advance of the pattern, which must be avoided.

One method is to increase the turning radius. Instead of the optimum half-cutting width, setting the radius larger than the half-track width will leave a gap between rows that can compensate for the possible directional error and ensure the advance of the pattern. While the pattern is no longer a neat and tight parallel pattern as one may prefer, the purpose of the pattern is to do localized mowing but not a perfect area filling so the compromise should be acceptable. Since the error is accumulative, the compensation can be small at the start and increase gradually with the progress of the pattern. For example, the turning radius can start at the optimum half-cutting width and increase gradually as the pattern progresses. With the accumulation of errors and the increase of the turning radius, the pattern becomes less regular, which can smoothly transit to a random pattern when the pattern is done.

In various embodiments, the orientation of a parallel pattern (pattern angle, the direction of the rows) is chosen randomly, which is preferred as it can maximize the possibility of coverage. On the other hand, it is possible that certain pattern angles could have higher coverage efficiency than others.

For example, on a long narrow piece of lawn, if the rows of the pattern are parallel to the longitudinal side, there will be fewer turnarounds. On the contrary, if the rows are perpendicular to the longitudinal sides, the mower will need to go back and forth repeatedly in a short distance that involves a lot of turning around. In this example, the mower can put lower weighting to the directions that are perpendicular to the longitudinal side.

Furthermore, for each starting point, the mower can log the number of turns and the total distance traveled while doing the pattern. The ratio between the number of turns and the total distance traveled is called the turn ratio. The larger the turn ratio, the more likely the mower is doing turning than doing rows, which means low coverage efficiency. As data in the database grows, the mower can then predict the relation between pattern angles and turn ratios for a starting point. This information can be used in determining the pattern angle.

Although parallel patterns are mentioned above, the method can also be applied on other types of patterns, such as circular patterns. However, a parallel pattern has an advantage in that it involves less complex maneuvers so it is more suitable for when precision navigation reference is not available.

Figure 2:
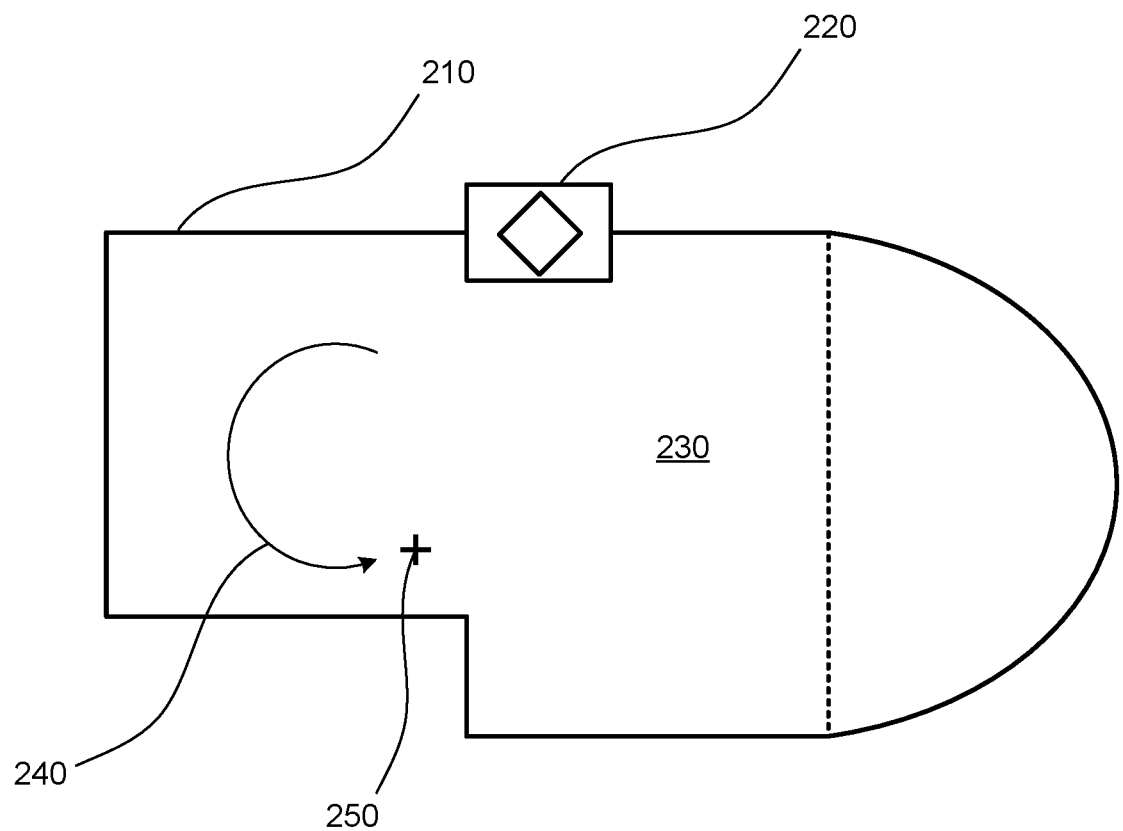
FIG. 2 is an exemplary diagram showing a boundary wire enclosed area, in accordance with various embodiments.

FIG. 2 is an exemplary diagram 200 showing a boundary wire enclosed area, in accordance with various embodiments. Boundary wire 210 is connected to docking station 220 and encloses and defines mowing area 230. In addition to being a charging point for the lawnmower, docking station 220 also generates a boundary wire signal to boundary wire 210. The lawnmower has boundary wire sensors so that it can detect the boundary wire signal to determine if it is inside or outside of mowing area 230. It can also use the sensors to follow boundary wire 210 to drive around mowing area 230. While various embodiments do not limit the direction, for example, it is assumed the mower follows boundary wire 210 wire in a counter-clockwise direction 240, and all counter-clockwise direction changes are denoted by positive angle 250.

Figure 3:
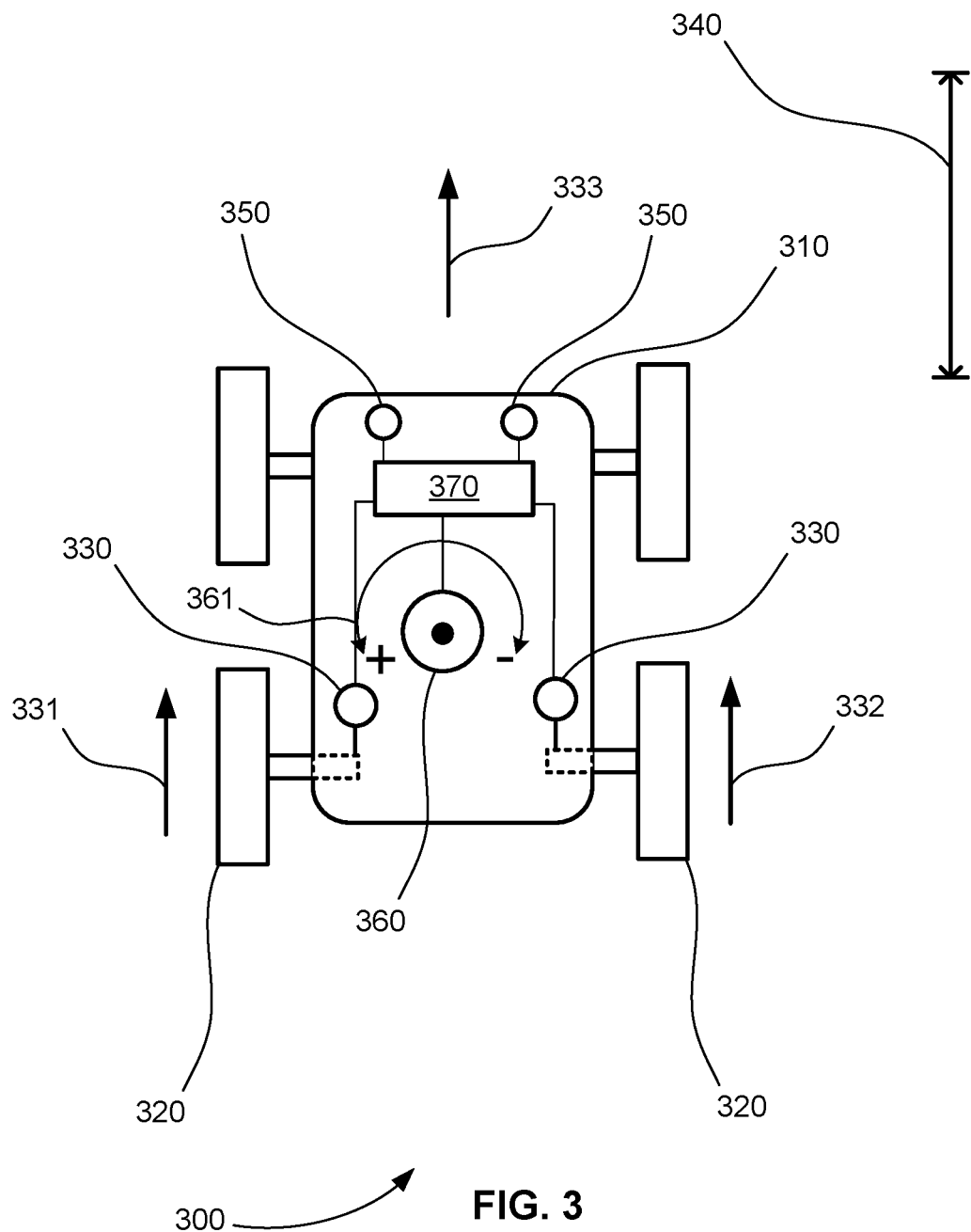
FIG. 3 is an exemplary diagram showing the navigation reference devices of a lawnmower, in accordance with various embodiments.

FIG. 3 is an exemplary diagram 300 showing the navigation reference devices of a lawnmower, in accordance with various embodiments. Lawnmower 310 is driven by drive wheels 320, which have a known circumference. The rotation speeds of drive wheels 320 are measured by tachometers 330. Multiplying the rotation speed by the wheel circumference, the translational speed of each of the drive wheels 320 can be calculated. These speeds are translational speed 331 and translational speed 332. The average of the translational speeds (331 and 332) of drive wheels 320 is translational speed 333 of lawnmower 310. Integrating translational speed 333 by the time taken produces distance 340, which is the distance traveled by lawnmower 310 in that period of time. Distance 340 is referred to as the odometer output.

One or more boundary wire sensors 350 detect if lawnmower 310 is inside or outside of the boundary. To follow the wire properly, usually, two or more of these sensors are required.

Gyroscope 360 is fixed on lawnmower 310, with its axis perpendicular to the plane of the mower so that turning rate 361 of lawnmower 310 is measured. When lawnmower 310 moves forward, the output of gyroscope 360, which is equal to turning rate 361 of lawnmower 310 is zero. If lawnmower 310 is turning left, for example, the output of the gyroscope is positive. If the mower is turning right, the output of gyroscope 360 is negative.

Figure 4:
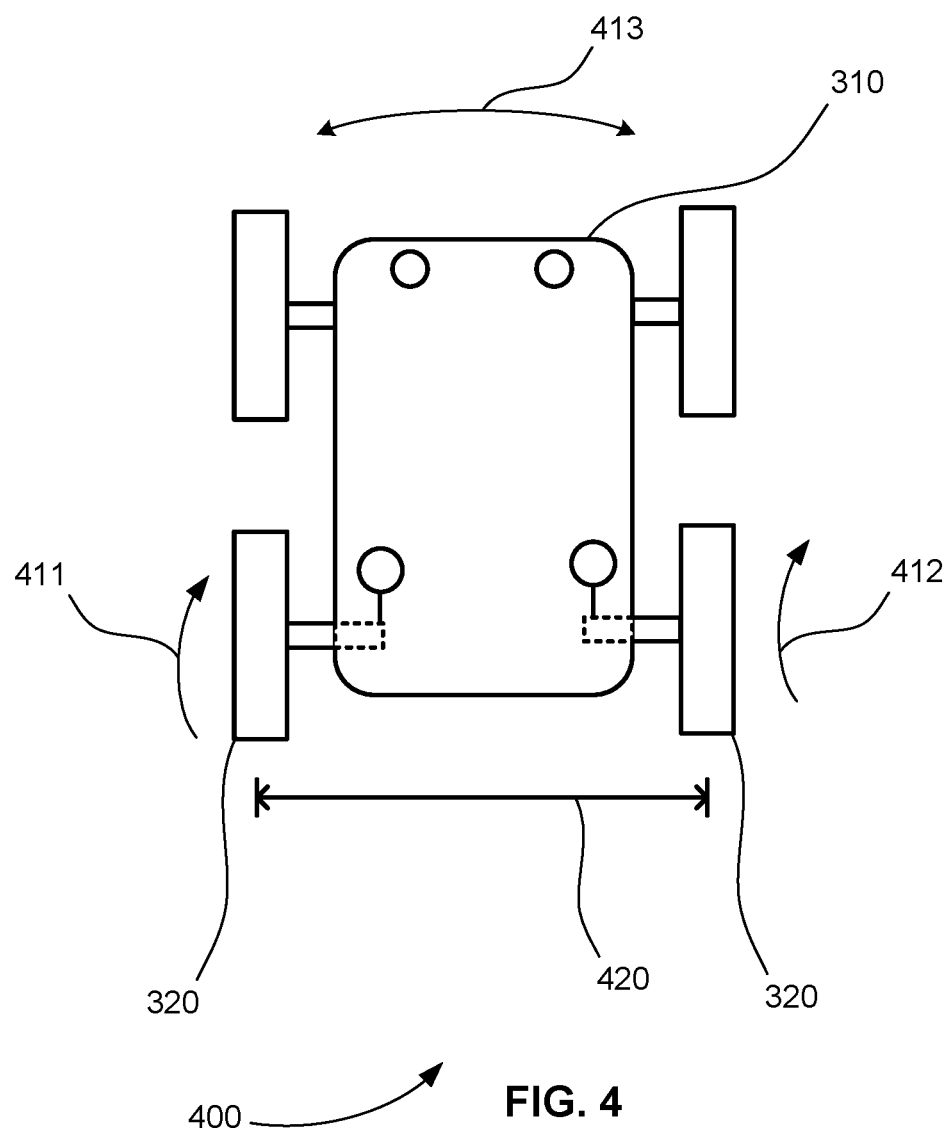
FIG. 4 is an exemplary diagram showing the lawnmower of FIG. 3 without a gyroscope, in accordance with various embodiments.

FIG. 4 is an exemplary diagram 400 showing the lawnmower of FIG. 3 without a gyroscope, in accordance with various embodiments. FIG. 4 shows a method to estimate the turning rate of lawnmower 310 without a gyroscope. Turning rate 413 of lawnmower 310 is proportional to the difference of rotational speed 411 and rotational speed 412 of drive wheels 320, namely w=R (wr−wl)/K, where w is turning rate 413 of lawnmower 310, R is the radius of drive wheels 320 (2n), K is track width 420, and wl (411) and wr (412) are the rotation speed of the right and left driving wheels respectively.

FIG. 5 is an exemplary diagram 500 showing plots of distance versus time and angular velocity versus time that depict exemplary odometer data and gyroscope data, respectively, when the lawnmower is stationary, in accordance with various embodiments. FIG. 5 shows that, when the lawnmower is stationary, the distance traveled 511 in plot 510 over time T is zero. Similarly, when the lawnmower is stationary, the angular velocity 521 in plot 520 over time T is zero.

FIG. 6 is an exemplary diagram 600 showing plots of distance versus time and angular velocity versus time that depict exemplary odometer data and gyroscope data, respectively, when the lawnmower is moving forward at a constant speed, in accordance with various embodiments. FIG. 6 shows that, when the lawnmower is moving forward at a constant speed, the distance traveled 611 in plot 610 over time T is a positive ramp output. In contrast, when the lawnmower is moving forward at a constant speed, the angular velocity 621 in plot 620 over time T is zero.

FIG. 7 is an exemplary diagram 700 showing plots of distance versus time and angular velocity versus time that depict exemplary odometer data and gyroscope data, respectively, when the lawnmower is moving backward at a constant speed, in accordance with various embodiments. FIG. 7 shows that, when the lawnmower is moving backward at a constant speed, the distance traveled 711 in plot 710 over time T is a negative ramp output. In contrast, when the lawnmower is moving backward at a constant speed, the angular velocity 721 in plot 720 over time T is zero.

FIG. 8 is an exemplary diagram 800 showing plots of distance versus time and angular velocity versus time that depict exemplary odometer data and gyroscope data, respectively, when the lawnmower is pirouetting left at a constant angular velocity, in accordance with various embodiments. FIG. 8 shows that, when the lawnmower is pirouetting left at a constant angular velocity, the distance traveled 811 in plot 810 over time T is zero. In contrast, when the lawnmower is pirouetting left at a constant angular velocity, the angular velocity 821 in plot 820 over time T is a constant positive output.

FIG. 9 is an exemplary diagram 900 showing plots of distance versus time and angular velocity versus time that depict exemplary odometer data and gyroscope data, respectively, when the lawnmower is pirouetting right at a constant angular velocity, in accordance with various embodiments. FIG. 9 shows that, when the lawnmower is pirouetting right at a constant angular velocity, the distance traveled 911 in plot 910 over time T is zero. In contrast, when the lawnmower is pirouetting right at a constant angular velocity, the angular velocity 921 in plot 920 over time T is a constant negative output.

FIG. 10 is an exemplary diagram 1000 showing plots of distance versus time and angular velocity versus time that depict exemplary odometer data and gyroscope data, respectively, when the lawnmower is turning left at a constant speed and constant turning rate, in accordance with various embodiments. FIG. 10 shows that, when the lawnmower is turning left at a constant speed and constant turning rate, the distance traveled 1011 in plot 1010 over time T is a positive ramp output. In contrast, when the lawnmower is turning left at a constant speed and constant turning rate, the angular velocity 1021 in plot 1020 over time T is a constant positive output.

FIG. 11 is an exemplary diagram 1100 showing plots of distance versus time and angular velocity versus time that depict exemplary odometer data and gyroscope data, respectively, when the lawnmower is turning right at a constant speed and constant turning rate, in accordance with various embodiments. FIG. 11 shows that, when the lawnmower is turning right at a constant speed and constant turning rate, the distance traveled 1111 in plot 1110 over time T is a positive ramp output. In contrast, when the lawnmower is turning right at a constant speed and constant turning rate, the angular velocity 1121 in plot 1120 over time T is a constant negative output.

Note that FIGS. 5-11 depict idealized examples. In practice, the output can be affected by noise and drift that requires a suitable filtering circuit or software, for example.

Figure 12:
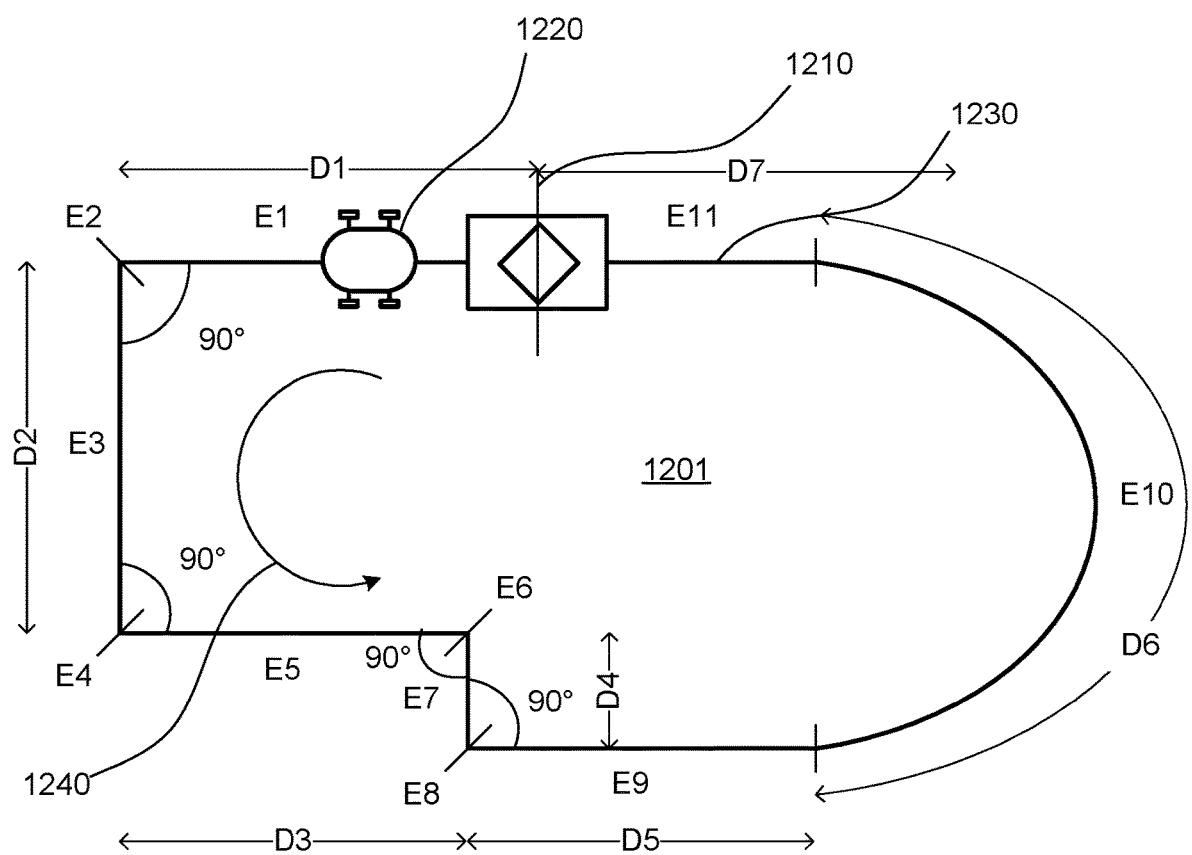
FIG. 12 is an exemplary diagram showing how the boundary of a boundary wire enclosed area is determined from odometer data and gyroscope data, in accordance with various embodiments.

FIG. 12 is an exemplary diagram 1200 showing how the boundary of a boundary wire enclosed area is determined from odometer data and gyroscope data, in accordance with various embodiments. Starting from fixed reference point 1210 in FIG. 12, which is the location of the docking station, lawnmower 1220 follows boundary wire 1230 of enclosed area 1201 back to reference point 1210 to complete one cycle of acquisition. As lawnmower 1220 travels in counter-clockwise direction 1240, lawnmower 1220 records the data or outputs from the odometer and the gyroscope shown in FIG. 13 during the process. From the odometer and the gyroscope data, lawnmower 1220 can determine the type of different elements it encounters along boundary wire 1230.

As lawnmower 1220 follows boundary wire 1230 from reference point 1210, it first encounters element E1. In element E1, lawnmower 1220 moves in a straight line at a constant speed for distance D1.

FIG. 13 is an exemplary diagram 1300 showing plots of distance versus time and angular velocity versus time that depict exemplary odometer data and gyroscope data, respectively, when the lawnmower of FIG. 12 follows the boundary of FIG. 12, in accordance with various embodiments. In FIG. 13, as lawnmower 1220 in FIG. 12 moves in a straight line at a constant speed along element E1, the distance traveled over time or odometer output shown in plot 1310 of FIG. 13 is a positive ramp output to distance D1. For the same period, the angular velocity over time or gyroscope output shown in plot 1320 of FIG. 13 is zero.

At element or corner E2 in FIG. 12, lawnmower 1220 turns left 90 degrees. The odometer output shown in plot 1310 of FIG. 13 is close to zero. For the same period, the gyroscope output shown in plot 1320 of FIG. 13 is a positive value. Note that integrating the gyroscope output for the time period produces the angle turned, i.e., 90 degrees.

At element E3 in FIG. 12, lawnmower 1220 moves again in a straight line at a constant speed. The odometer output shown in plot 1310 of FIG. 13 is a positive ramp output to distance D1+D2. For the same period, the gyroscope output shown in plot 1320 of FIG. 13 is zero.

At element or corner E4 in FIG. 12, lawnmower 1220 turns left again 90 degrees. The odometer output shown in plot 1310 of FIG. 13 is close to zero. For the same period, the gyroscope output shown in plot 1320 of FIG. 13 is a positive value. Again, integrating the gyroscope output for the time period produces the angle turned, i.e., 90 degrees.

At element E5 in FIG. 12, lawnmower 1220 moves again in a straight line at a constant speed. The odometer output shown in plot 1310 of FIG. 13 is a positive ramp output to distance D1+D2+D3. For the same period, the gyroscope output shown in plot 1320 of FIG. 13 is zero.

At element or corner E6 in FIG. 12, lawnmower 1220 now turns right 90 degrees. The odometer output shown in plot 1310 of FIG. 13 is close to zero. For the same period, the gyroscope output shown in plot 1320 of FIG. 13 is a negative value.

At element E7 in FIG. 12, lawnmower 1220 moves again in a straight line at a constant speed. The odometer output shown in plot 1310 of FIG. 13 is a positive ramp output to distance D1+D2+D3+D4. For the same period, the gyroscope output shown in plot 1320 of FIG. 13 is zero.

At element or corner E8 in FIG. 12, lawnmower 1220 now turns left 90 degrees. The odometer output shown in plot 1310 of FIG. 13 is close to zero. For the same period, the gyroscope output shown in plot 1320 of FIG. 13 is a positive value.

At element E9 in FIG. 12, lawnmower 1220 moves again in a straight line at a constant speed. The odometer output shown in plot 1310 of FIG. 13 is a positive ramp output to distance D1+D2+D3+D4+D5. For the same period, the gyroscope output shown in plot 1320 of FIG. 13 is zero.

At element E10, lawnmower 1220 follows a path of constant curvature. As with a straight path, the odometer output shown in plot 1310 of FIG. 13 is a positive ramp output to distance D1+D2+D3+D4+D5+D6. However, the gyroscope output shown in plot 1320 of FIG. 13 has a non-zero positive value. Integrating the gyroscope output for the time period produces the angle turned, i.e., 180 degrees.

Finally, at element E11, lawnmower 1220 moves again in a straight line at a constant speed back to reference point 1210. The odometer output shown in plot 1310 of FIG. 13 is a positive ramp output to distance D1+D2+D3+D4+D5+ D6+D7. For the same period, the gyroscope output shown in plot 1320 of FIG. 13 is zero. FIGS. 12 and 13 show how odometer data and gyroscope data are used to determine the elements of the boundary wire.

Figure 14:
FIG. 14 is an exemplary table showing the type of elements determined from the data shown in FIG. 13, in accordance with various embodiments.

FIG. 14 is an exemplary table 1400 showing the type of elements determined from the data shown in FIG. 13, in accordance with various embodiments. As shown in table 1400, six line elements, four node elements, and one curve element were found in the boundary wire of FIG. 12.

The lawnmower of FIG. 12 was running at a constant speed during the acquisition of the data shown in FIG. 13. Based on the recorded outputs of the odometer and gyroscope, the lawnmower identified three elements. A line element is identified when the gyroscope output is zero and the odometer output is a prolonged constant ramp. A node element is identified when there is a large change in gyroscope output in a short period of time. A curve element is identified when there is a small constant output of the gyroscope and a prolonged constant ramp output of the odometer. In various embodiments, the acquisition process can be repeated to average out errors and abnormalities.

FIG. 15 is an exemplary plot 1500 showing the relationship between the mowing time per week and the lawn area, in accordance with various embodiments. Generally, the larger the area, the longer the time the mower takes to maintain the lawn. That is, the mowing time is proportional to the size of the lawn, as shown in portion 1510 of the graph of mowing time per week versus the lawn area in plot 1500. Note that the graph is just to show a proportional relation. The actual time-size relation does not need to be a linear relation as the graph shows. There is a maximum time 1520 that the lawnmower can operate in a week, which indicates a largest area 1530 the lawnmower can handle properly. The lawnmower also keeps a minimum mowing time per week 1540 for an area smaller than a certain size 1550. If the lawn is found unrealistically small, it could indicate an error and should be handled separately. With the lawn size known, it is possible for the mower to estimate the optimum mowing time per week.

FIG. 16 is an exemplary diagram 1600 showing how the complexity of the lawn layout can affect the mowing time, in accordance with various embodiments. Both the lawns 1610 and 1620 shown in FIG. 16 have the same area. However, lawn 1610 is much more complex than 1620. Lawn 1610 also has "islands" or obstacles 1611 and 1612 inside the mowing area. In general, the more complex the lawn layout, the higher the chance the mower would hit the boundary or obstacle. When a boundary is hit, the lawnmower needs to turn around for a new course and this reduces the coverage efficiency. So, in addition to the size of the lawn, the total length of the boundary for a given area and the number of boundary characteristics elements can be used as a reference to estimate the complexity of the lawn layout and, thus, the mowing time.

Figure 17:
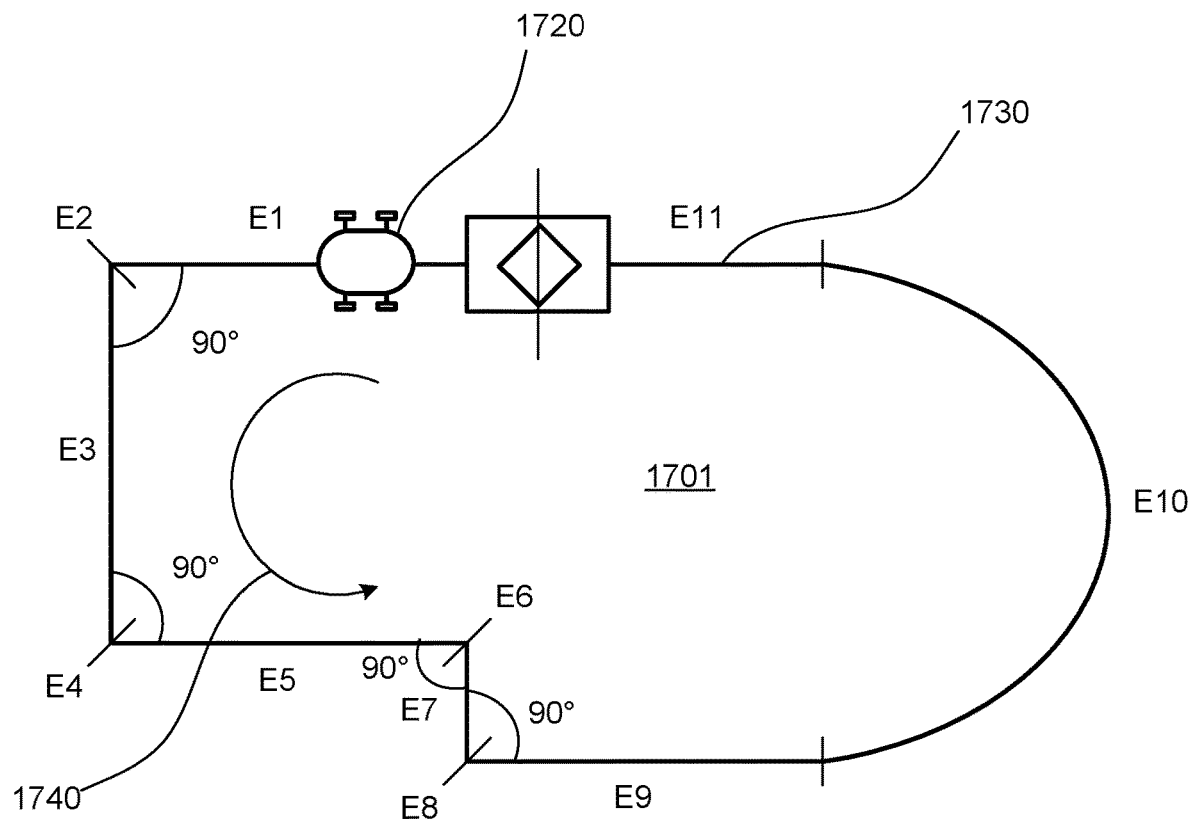
FIG. 17 is an exemplary diagram showing how traversing the boundary in one direction allows the area of the lawn to be identified, in accordance with various embodiments.

FIG. 17 is an exemplary diagram 1700 showing how traversing the boundary in one direction allows the area of the lawn to be identified, in accordance with various embodiments. For example, if lawnmower 1720 traverses boundary wire 1730 in counter-clockwise direction 1740 and starts along element E1, lawn area 1701 is always on the left and is always inside the boundary. This is also true for the other boundary elements. By going through all the elements of the boundary, it is possible to identify lawn area 1701, which is enclosed by boundary wire 1730. In various embodiments, to find lawn area 1701, a two-dimensional array of memory M[x,y] is used to represent a lawn.

Figure 18:
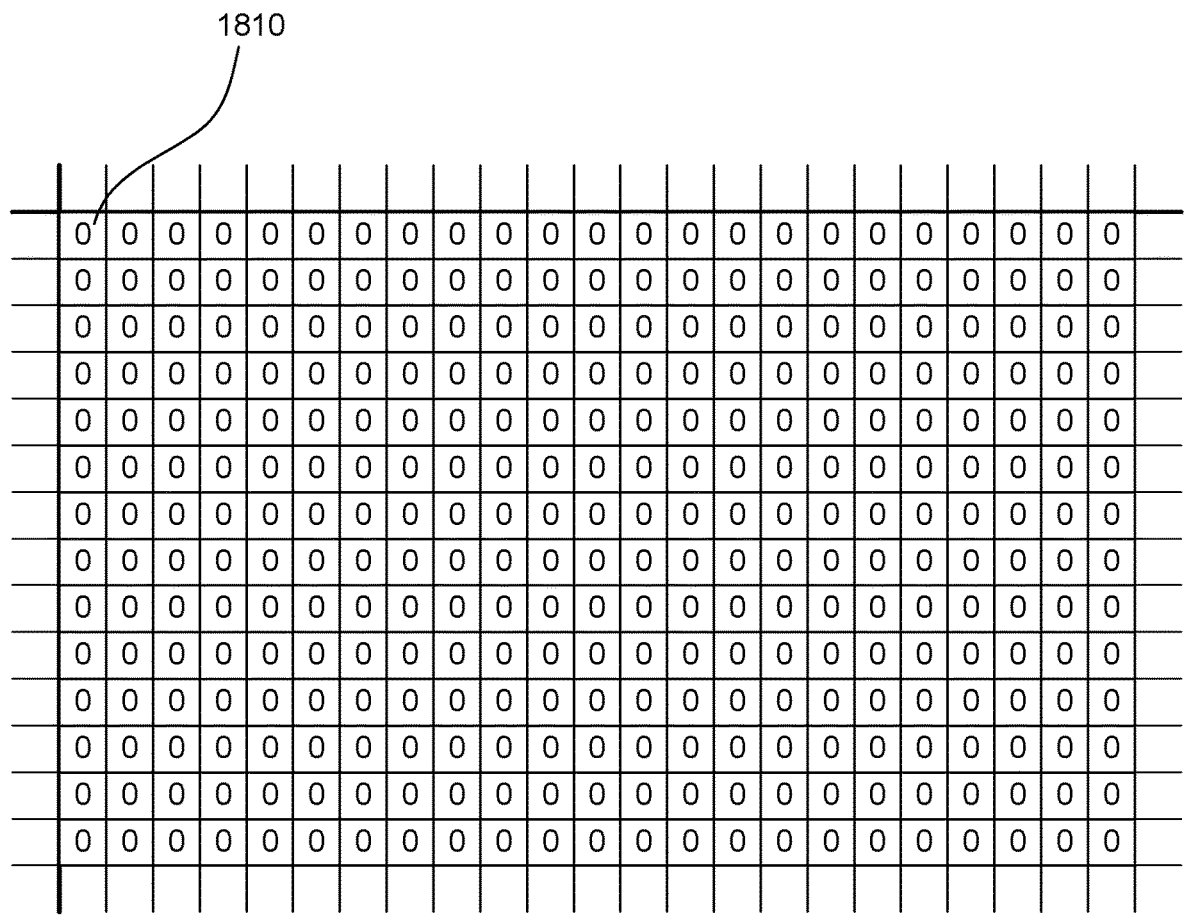
FIG. 18 is an exemplary two-dimensional array of memory cells used to represent a lawn, in accordance with various embodiments.

FIG. 18 is an exemplary two-dimensional array 1800 of memory cells used to represent a lawn, in accordance with various embodiments. Each memory cell 1810 represents a unit area. Each memory cell 1810 is given an initial value to indicate that the unit area is outside of the lawn area. This initial value is zero, for example. A memory cell is set to a first value if that unit area is inside the boundary. The first value is one, for example. A memory cell is set to a second value if that unit area is on the boundary. The second value is two, for example.

The area of the mowing area can be calculated by counting the total number of memory cells that are not set to the initial value. The procedure includes three steps. In the first step, all memory cells are reset to the initial value. In the second step, the memory cells that are on the boundary are set to the second value. In the third step, for each element on the boundary, the memory cells that are +90 degrees from the direction of the boundary element until meeting another cell that has been set to the second value are set to the first value. When all three steps have been completed, the area of the mowing area is then calculated as the total number of cells that do not have the initial value times the unit area of a cell.

Figure 19:
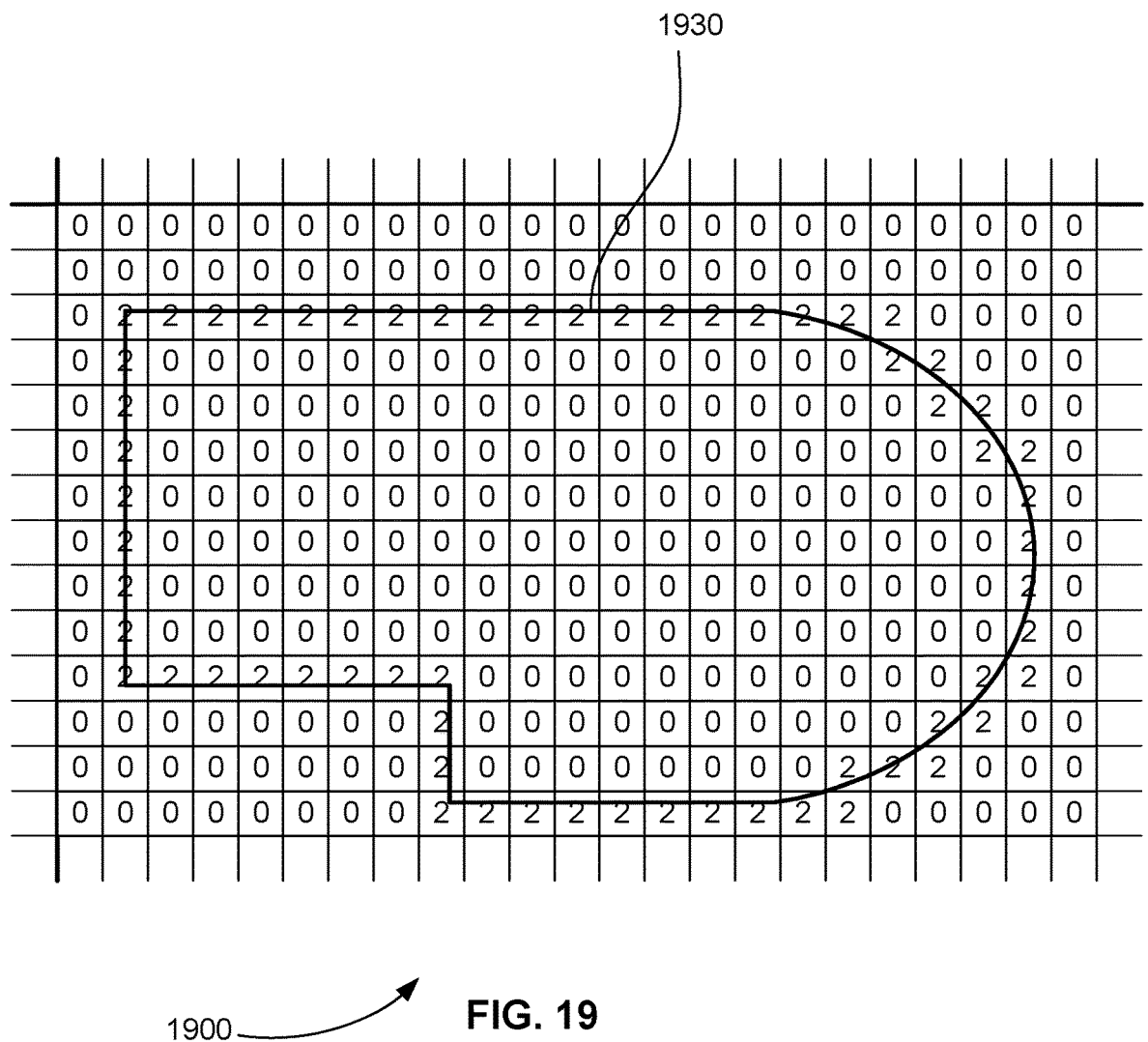
FIG. 19 is an exemplary two-dimensional array of memory cells showing how the values of memory cells that are on the boundary are set to the second value, in accordance with various embodiments.

FIG. 19 is an exemplary two-dimensional array 1900 of memory cells showing how the values of memory cells that are on the boundary are set to the second value, in accordance with various embodiments. In FIG. 19, each memory cell that overlaps with boundary 1930 is set to the second value. The second value is two, for example. Boundary 1930 is, for example, the boundary made by boundary wire 1730 shown in FIG. 17.

Figure 20:
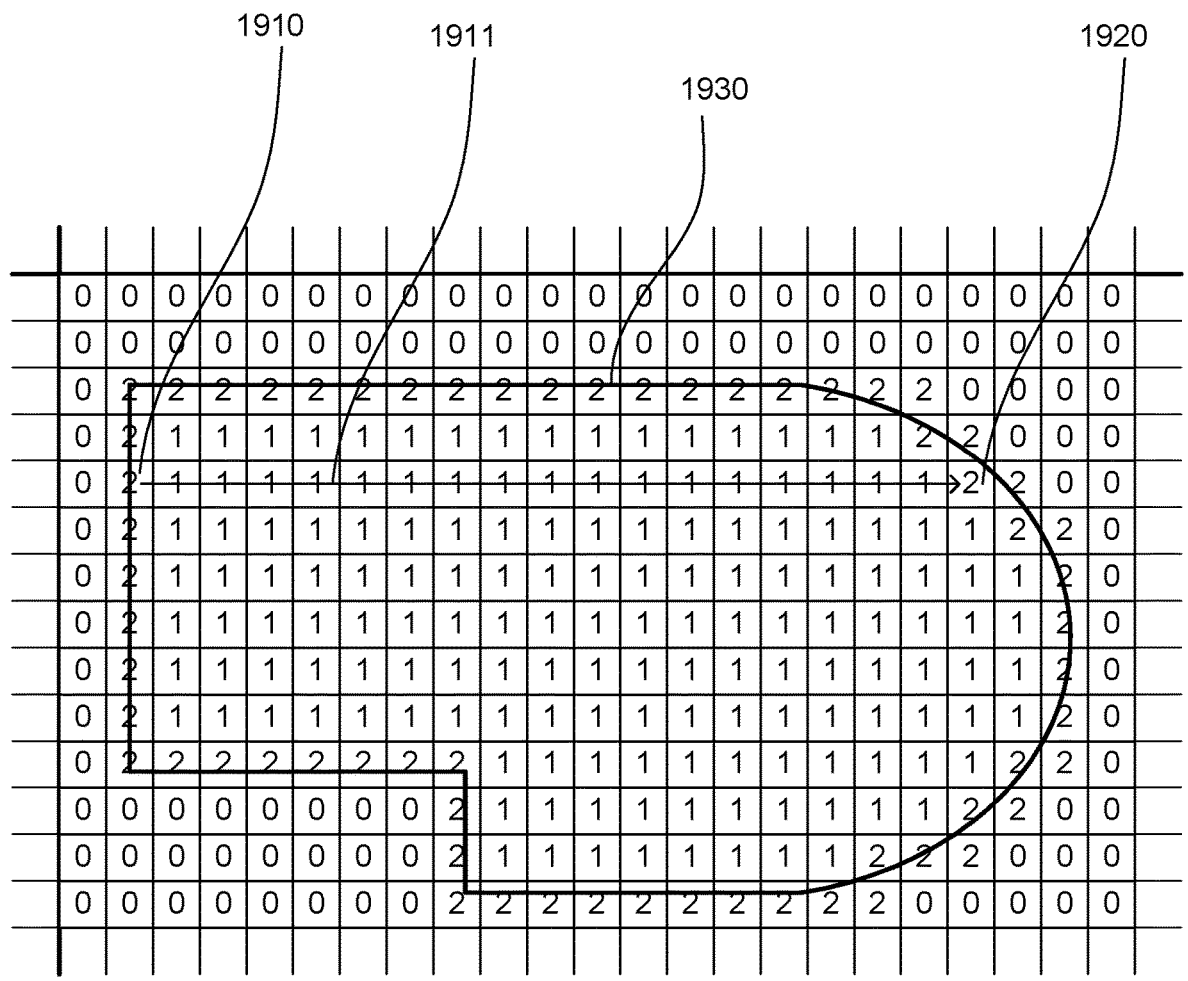
FIG. 20 is an exemplary two dimensional array of memory cells showing how the values of memory cells that are +90 degrees from the direction of a boundary element until meeting another cell that has been set to the second value are set to the first value, in accordance with various embodiments.

FIG. 20 is an exemplary two-dimensional array 2000 of memory cells showing how the values of memory cells that are +90 degrees from the direction of a boundary element until meeting another cell that has been set to the second value are set to the first value, in accordance with various embodiments. For example, in FIG. 20, cell 1910 is a boundary element. Arrow 1911 shows all the cells that are +90 degrees from the direction of cell 1910 before meeting cell 1920, which is also a boundary element. All of the cells along the arrow are set to the first value. The first value is one, for example. When this is done for all boundary element cells, the entire area of cells inside the boundary is set to the first value, as shown in FIG. 20. As described above, the area of the mowing area is then calculated as the total number of cells that do not have the initial value times the unit area of a cell. In FIG. 20, the area is then the total number of cells that are nonzero times the unit area of a cell.

Returning to FIGS. 12 and 13, these Figures show how a lawnmower can go to a specific point on the boundary. For example, starting from reference point 1210 in FIG. 12, lawnmower 1220 acquired the boundary characteristics and recorded these as boundary characteristics as elements E1 to E11. Line and curve boundary elements also have distances that are recorded. Thus, to go to a specific location on element E10 that is distance DX from reference point 1210, for example, lawnmower 1220 first finds the largest sum of distances of elements that is smaller than DX. Then, starting from reference point 1210, lawnmower 1220 follows boundary wire 1230 until element E10 is reached at distance D1+D2+D3+D4+D5. To reach the specific location on element E10, lawnmower 1220 follows element E10 for a distance of DX−D1+D2+D3+D4+D5.

Using this method, lawnmower 1220 can effectively go to different parts of the lawn by following the boundary wire. In other words, after acquiring elements E1 through E11, lawnmower 1220 can select many different starting points along boundary wire 1230 for mowing.

In various embodiments, for each mow-charge cycle, lawnmower 1220 starts by going to one of the starting points and starts mowing from there. In various embodiments, lawnmower 1220 goes to two or more different starting points for each mowing cycle so different parts of the lawn are visited evenly. In various embodiments, different factors are used to determine the location of the starting points. All these factors can be deduced from the boundary characteristics acquired when lawnmower 1220 determines the boundary elements.

FIG. 21 is an exemplary diagram 2100 showing starting points that are equidistant from each other, in accordance with various embodiments. In FIG. 21, the distance, L, between each of starting points 2110 is the same. This is a simple method and is suitable for a lawn of simple geometry.

Figure 22:
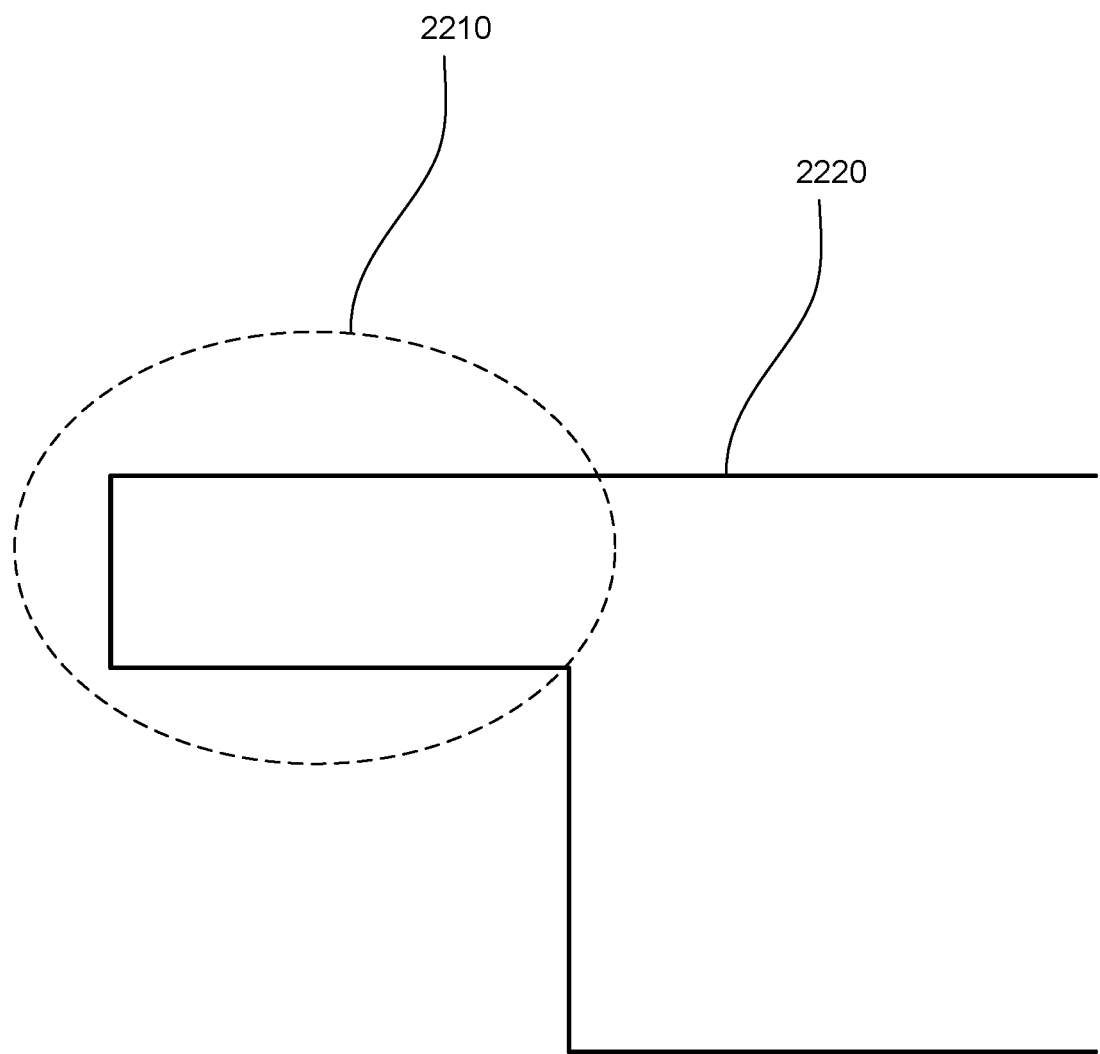
FIG. 22 is an exemplary diagram showing part of a lawn area that has a small separate area, in accordance with various embodiments.

FIG. 22 is an exemplary diagram 2200 showing part of a lawn area that has a small separate area, in accordance with various embodiments. In FIG. 22, the probability of entering small separate section 2210 of the lawn area surrounded by boundary 2220 is low. As a result, one or more starting points are placed in section 2210 to make sure it is visited.

FIG. 23 is an exemplary diagram 2300 showing a curved boundary that has an angle change greater than 180°, in accordance with various embodiments. In FIG. 23, the angle change greater than 180° can indicate a small entrance to a separate area. As a result, one or more starting points are placed on curve 2310 to make sure the area surrounded by the curve is visited.

Figure 24:
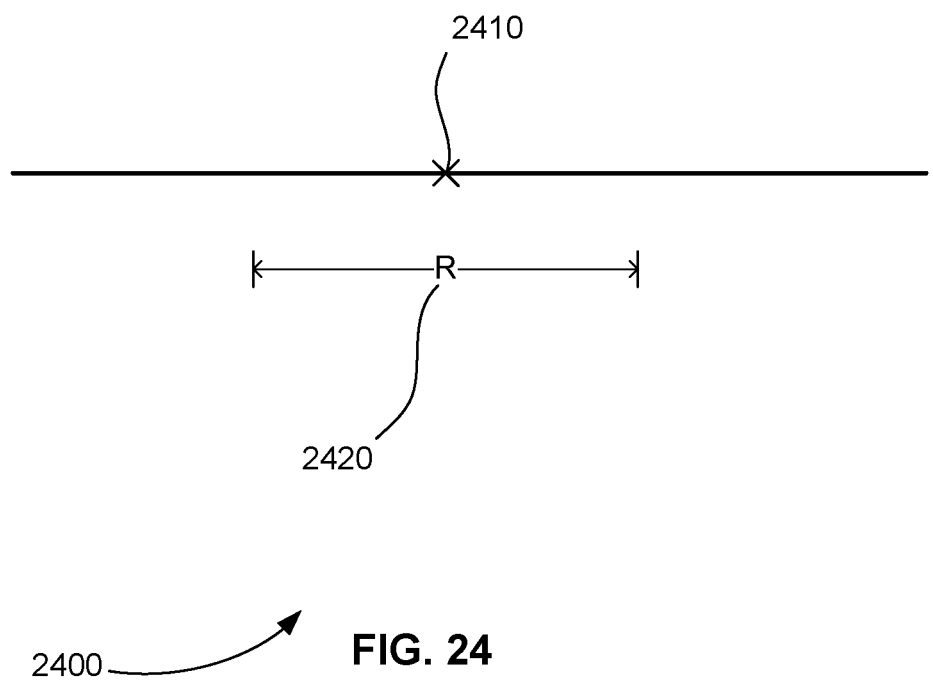
FIG. 24 is an exemplary diagram showing how a random factor is added to a starting point, in accordance with various embodiments.

FIG. 24 is an exemplary diagram 2400 showing how a random factor is added to a starting point, in accordance with various embodiments. In FIG. 24, the location of starting point 2410 is varied within range 2420 based on a random factor. It is preferred that starting points are not fixed but have certain variances to reduce the possibility of producing a coverage blind spot.

Figure 25:
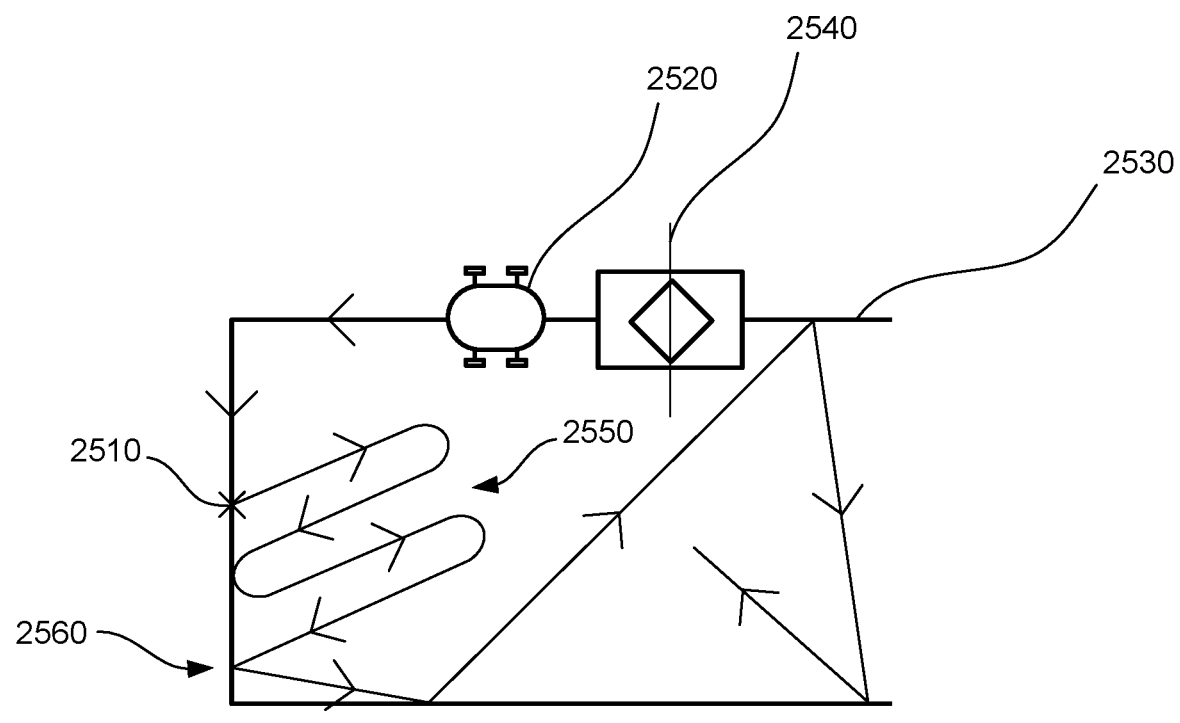
FIG. 25 is an exemplary diagram showing a mowing pattern that includes both parallel pattern mowing and random pattern mowing, in accordance with various embodiments.

FIG. 25 is an exemplary diagram 2500 showing a mowing pattern that includes both parallel pattern mowing and random pattern mowing, in accordance with various embodiments. In FIG. 25, after lawnmower 2520 leaves reference point 2540. After lawnmower 2520 reaches starting point 2510 along boundary wire 2530, lawnmower 2520 starts performing parallel pattern mowing 2550. After finishing parallel mowing pattern 2550, lawnmower 2520 changes to random pattern mowing at 2560 to continue the mowing session or cycle.

For a small area, parallel pattern mowing is possible at a low cost using a dead reckoning navigation reference, for example, such as a gyroscope and an odometer. The distance error from an odometer is not critical in pattern mowing so it can be ignored in this application. However, directional error from a gyroscope, for example, should be taken care of because it could result in overlapping of the tracks, thus reducing coverage efficiency.

Figure 26:
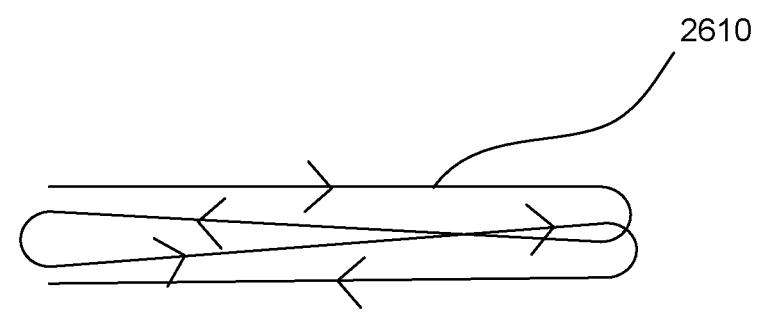
FIG. 26 is an exemplary diagram showing a parallel mowing pattern that includes directional error, in accordance with various embodiments.

FIG. 26 is an exemplary diagram 2600 showing a parallel mowing pattern that includes directional error, in accordance with various embodiments. FIG. 26 shows that directional error can cause the overlapping of the parallel tracks in parallel mowing pattern 2610.

Figure 27:
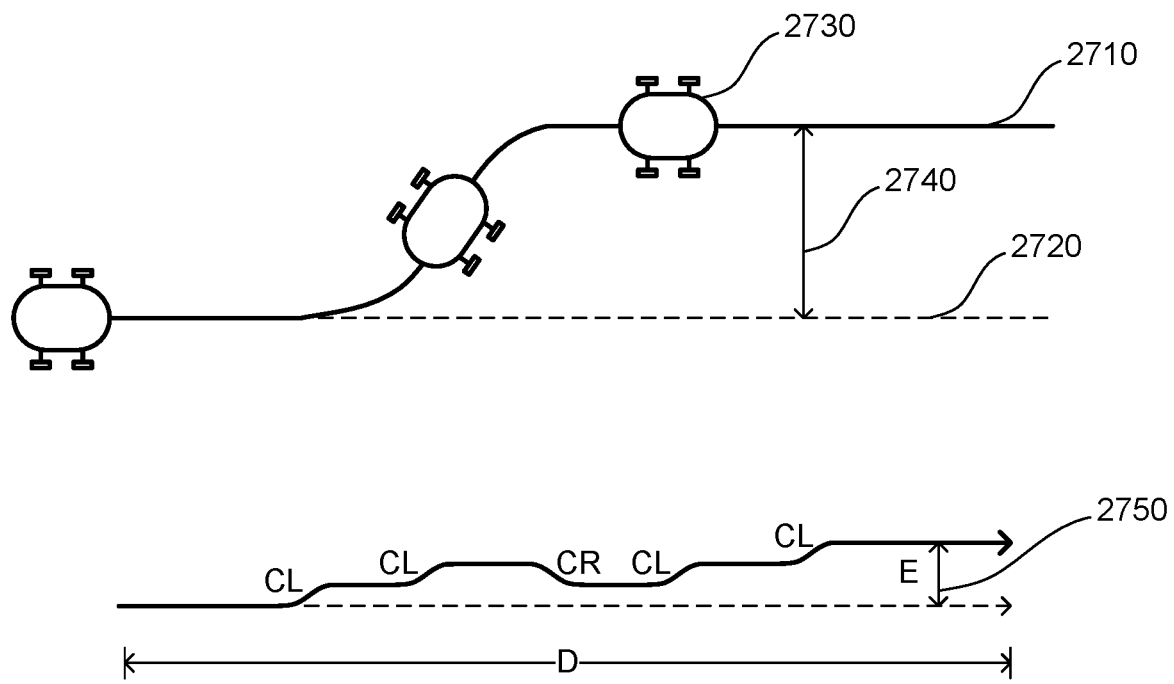
FIG. 27 is an exemplary diagram showing lateral drift due to directional correction and how an empirical formula can be setup to estimate the maximum lateral drift, in accordance with various embodiments.

FIG. 27 is an exemplary diagram 2700 showing lateral drift due to directional correction and how an empirical formula can be set up to estimate the maximum lateral drift, in accordance with various embodiments. One of the factors that causes track overlapping is the lateral drift due to directional correction along the track. In FIG. 27, actual path 2710 has drifted away from intended path 2720 after lawnmower 2730 makes a route correction. When the gyroscope, for example, senses a directional error, correction is executed to send lawnmower 2730 back to the original direction. However, this correction cannot correct lateral drift 2740, which has already occurred. Although it is possible to calculate the drift by the data of the correction path that has been taken, it requires a precise navigation reference. Alternately, an empirical formula can be set up to estimate the maximum lateral drift 2750.

For example, if lateral drift 2750 is E, then $E=K1*N+K2*D$, where N is the difference between the number of left and right corrections, D is the distance traveled, and K1 and K2 are constants. It is assumed that lateral drift 2750 is caused by left and right corrections (CL and CR) that are equal. As a result, left and right corrections cancel out each other. The net lateral drift is then proportional to the difference between the number of left and right corrections. The term $K2*D$ covers the error due to the uncertainty of dead reckoning navigation when the distance becomes large.

FIG. 28 is an exemplary diagram 2800 showing the relationship between track overlapping and cutting width of the lawnmower, in accordance with various embodiments. In FIG. 28, C is the cutting width of the lawnmower. If there is no lateral drift, a turn radius 2810 of C/2 gives the ideal cutting track without overlapping or gap. In various embodiments, the turn radius 2810 is made to be larger than C/2 to avoid any track overlapping due to navigation errors.

FIG. 29 is an exemplary diagram 2900 showing an increased turn radius in order to avoid track overlapping, in accordance with various embodiments. FIG. 29 is a worst-case scenario. The lateral drift is at maximum and both forward and backward trips drift to the opposite direction of the pattern build. If turn radius 2910 is set to a value greater than C/2, track overlapping is avoided even in this case.

Another possible factor is the drift of the gyroscope output. If there is no other absolute directional reference such as a compass to correct for the drift of the gyroscope output, the direction based on the integral of the gyroscope output (angular velocity) could accumulate errors over time.

Figure 30:
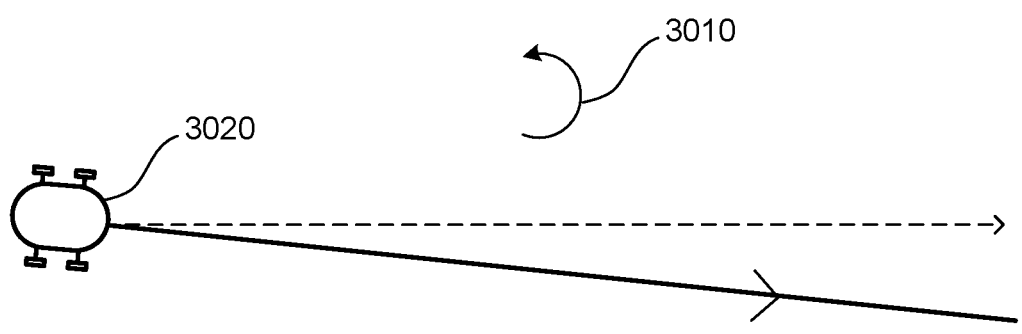
FIG. 30 is an exemplary diagram showing that a lawnmower turns clockwise if the direction reference drifts counterclockwise, in accordance with various embodiments.

FIG. 30 is an exemplary diagram 3000 showing that a lawnmower turns clockwise if the direction reference drifts counterclockwise, in accordance with various embodiments. In FIG. 30, direction reference drift 3010 is counterclockwise. As a result, lawnmower 3020 turns clockwise.

Figure 31:
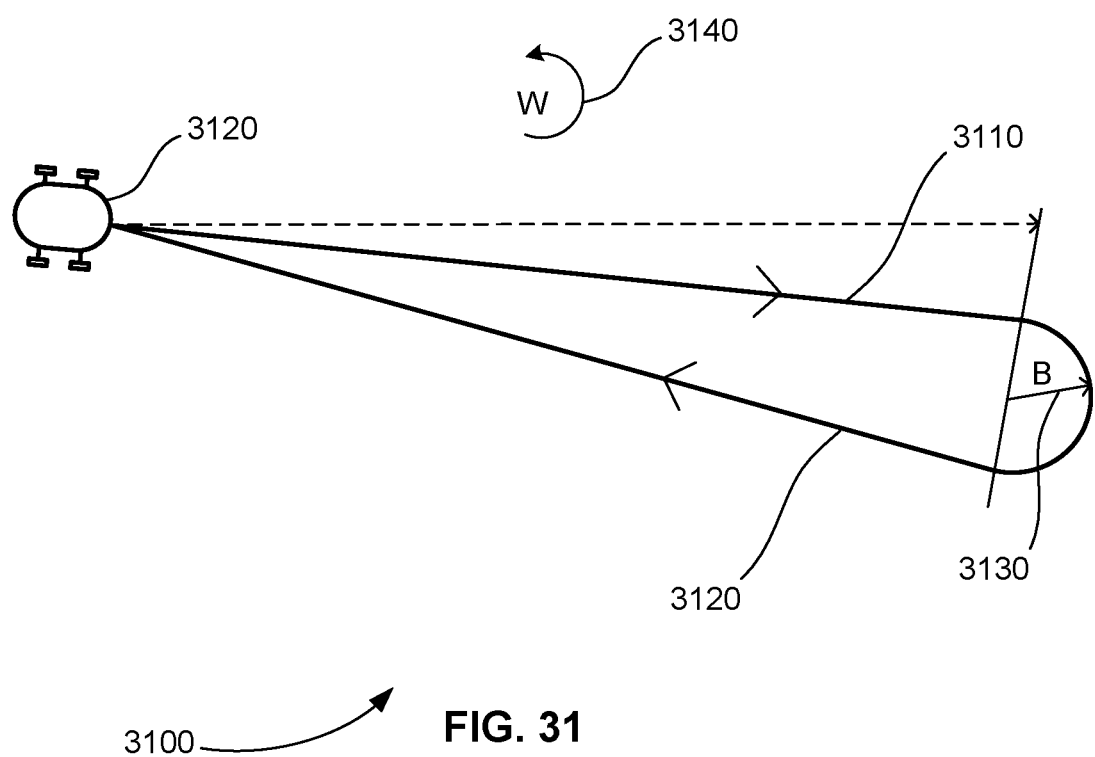
FIG. 31 is an exemplary diagram showing that forward and backward lawnmower paths do cross if the turning radius is larger than a certain value, in accordance with various embodiments.

FIG. 31 is an exemplary diagram 3100 showing that forward and backward lawnmower paths do cross if the turning radius is larger than a certain value, in accordance with various embodiments. FIG. 31 shows that forward path 3110 and backward path 3120 cross exactly when turning radius 3130 is B. So if turning radius 3130 is greater than B the paths do not cross. If maximum drift of the gyroscope 3140 is W, the distance traveled is D and the time taken to travel D is T. Then at the turnaround point, if turning radius 3130 is larger than B, where $B=(D/WT)(1-\cos(WT))$, there is no crossing at the other end. Combined with the lateral drift mentioned above, if the turning radius is larger than $B+E+C/2$, there is no track crossing. It should be noted that the formula refers to the worst case and there are also empirical factors.

FIG. 32 is an exemplary diagram 3200 showing how a turn radius gradually increases over time, in accordance with various embodiments. In FIG. 32, turn radius 3210 starts at C/2 and gradually increases to turn radius 3220 or $B+E+C/2$, when the pattern is finished. The pattern starts at tight coverage and changes to high error tolerance as errors accumulate while the pattern is building up.

Figure 33:
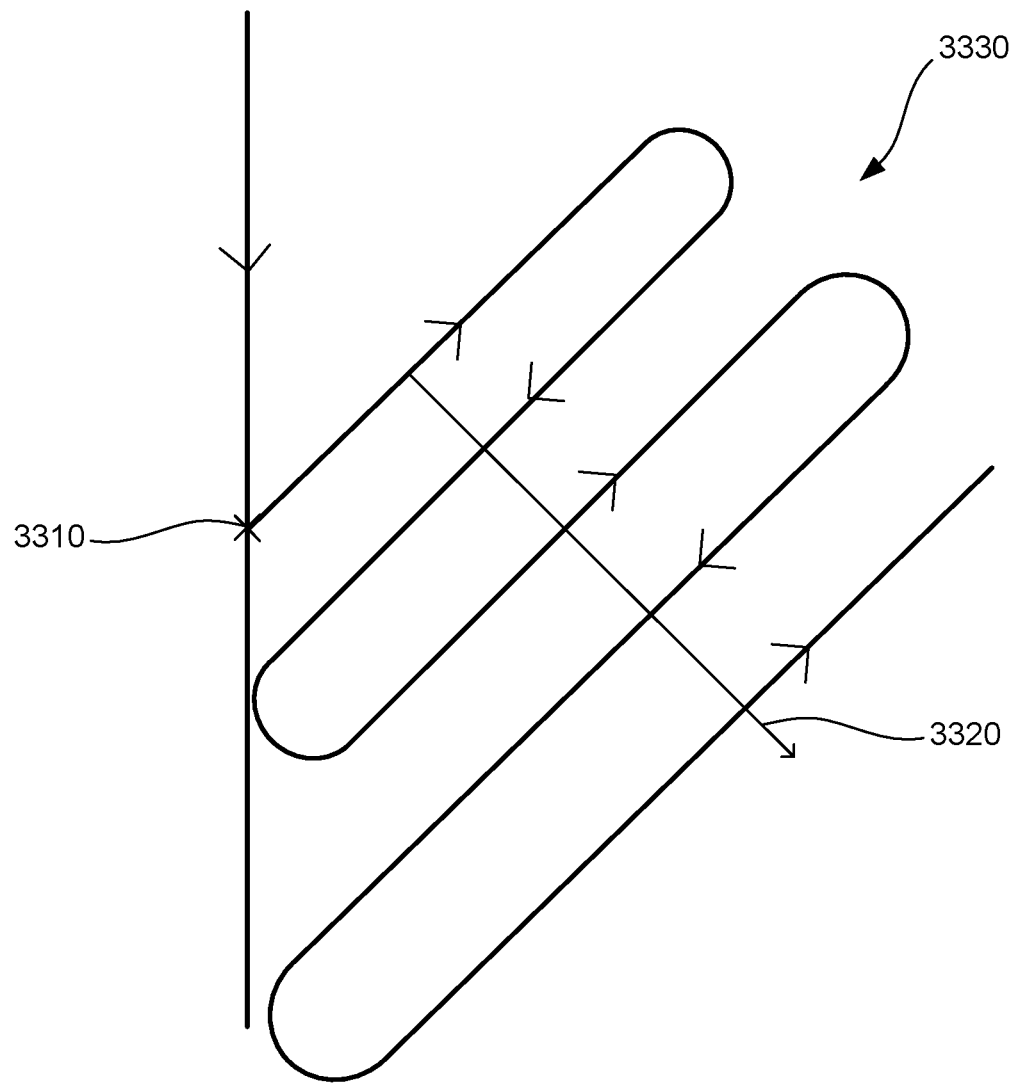
FIG. 33 is an exemplary diagram showing how the orientation of parallel pattern mowing can be chosen randomly, in accordance with various embodiments.

FIG. 33 is an exemplary diagram 3300 showing how the orientation of parallel pattern mowing can be chosen randomly, in accordance with various embodiments. When the lawnmower reaches starting point 3310 in FIG. 33, it randomly chooses orientation 3320 for pattern 3330. Compared to fixed orientation, random orientation can increase the possibility of coverage and thus reduce the chance of missing blind spots.

Figure 34:
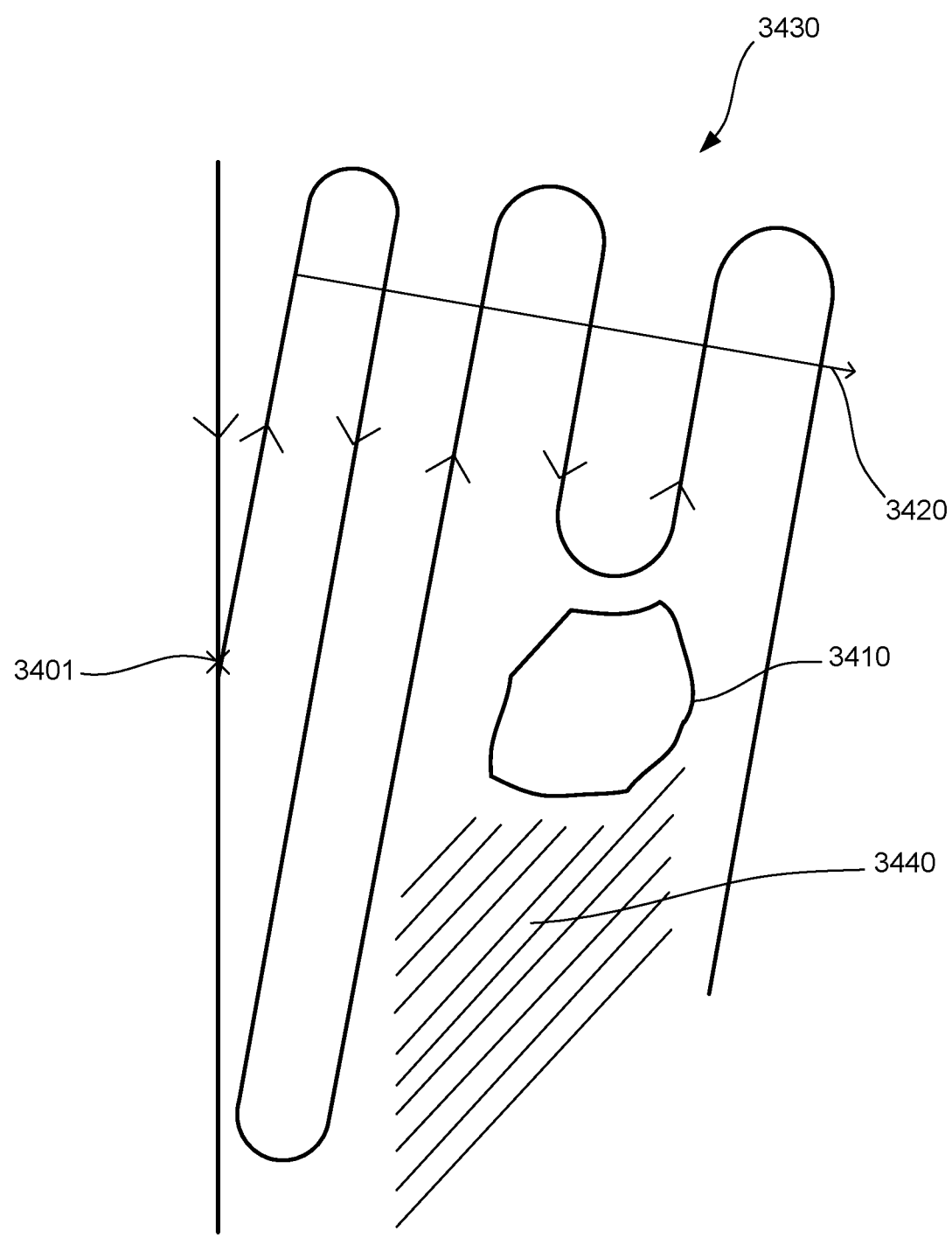
FIG. 34 is an exemplary diagram showing how a fixed orientation of parallel pattern mowing can produce a blind spot, in accordance with various embodiments.

FIG. 34 is an exemplary diagram 3400 showing how a fixed orientation of parallel pattern mowing can produce a blind spot, in accordance with various embodiments. If orientation 3420 of pattern 3430 is fixed, as shown in FIG. 34, blind spot 3440 is created by obstacle 3410.

Figure 35:
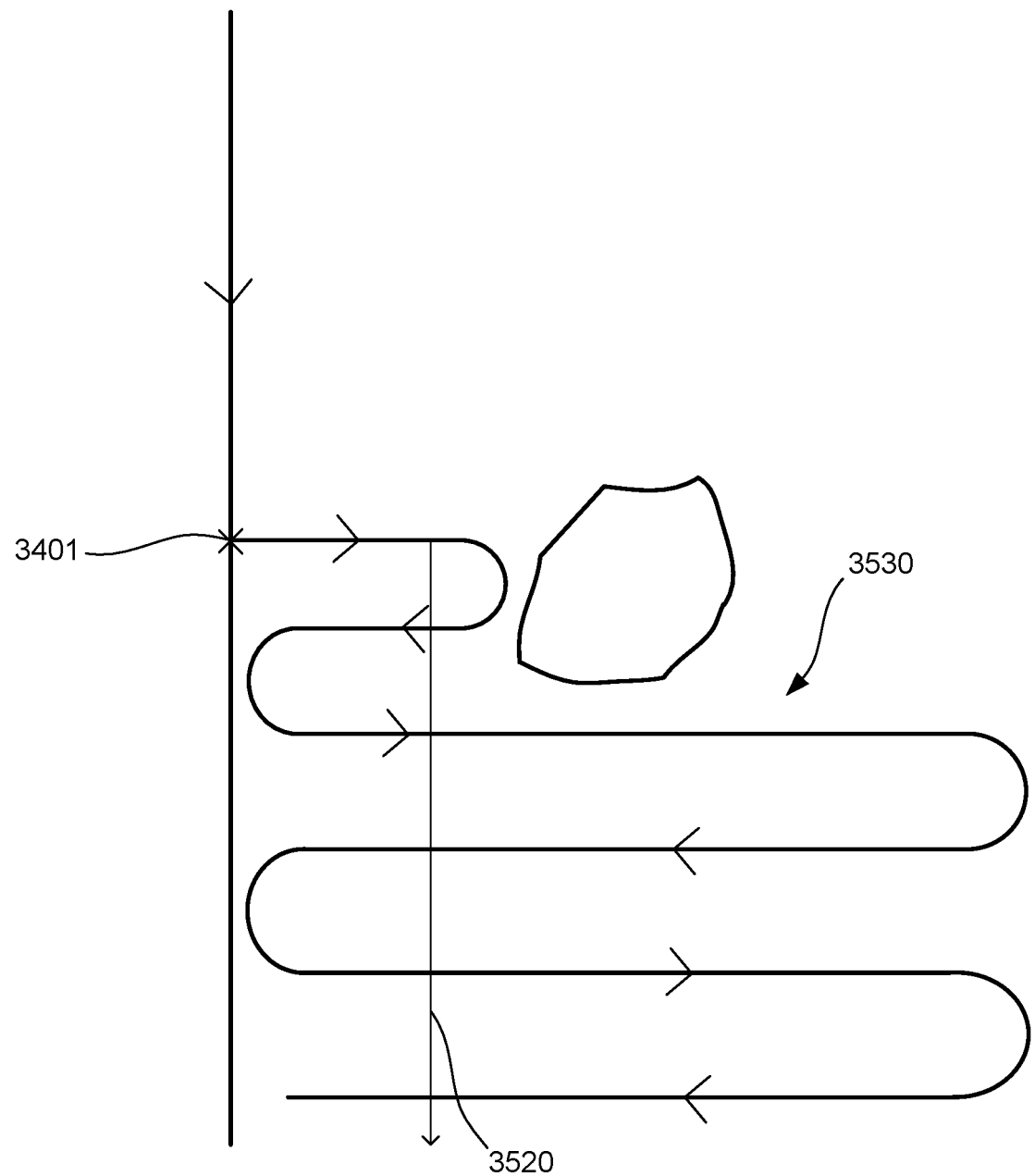
FIG. 35 is an exemplary diagram showing that randomly changing the orientation of parallel pattern mowing can remove a blind spot, in accordance with various embodiments.

FIG. 35 is an exemplary diagram 3500 showing that randomly changing the orientation of parallel pattern mowing can remove a blind spot, in accordance with various embodiments. For the same starting point 3401, as shown in FIG. 34, changing pattern 3530 to orientation 3520 in FIG. 35 covers blind spot 3440 shown in FIG. 34. Furthermore, a weighted random position generator can be used that favors certain orientations based on history.

FIG. 36 is an exemplary diagram 3600 showing two pattern orientations for the same piece of lawn that has a long and narrow geometry, in accordance with various embodiments. The turn ratio is the number of turns over the distance traveled. As turning is less efficient in mowing, a smaller turn ratio (fewer turns for the same distance traveled) is preferred. In this particular example, rows of path 3610 along the longitudinal edge have a smaller turn ratio than rows of path 3620, and are preferred. For each starting point 3601, the lawnmower can calculate and save the turn ratio of different orientations. It can then use the turn ratio history to adjust the random weighting for orientations of a lower turning ratio.

Lawnmower for Calculating a Mowing Area

Returning to FIG. 3, lawnmower 310 includes at least one boundary wire sensor 350, at least one distance sensor 330, at least one direction sensor 360, and at least one processor 370. At least one boundary wire sensor 350 is used for detecting the boundary wire. At least one distance sensor 330 is used for determining a distance traveled by lawnmower 310. At least one direction sensor 360 is used for determining a change in direction of the lawnmower.

At least one processor 370 represents just one of one or more processors that can be used in various embodiments. In other words, various embodiments are not limited to performing the steps described herein with a single processor. Processor 370 can be, but is not limited to, a controller, a computer, a microprocessor, the computer system of FIG. 1, or any device capable of analyzing data. Processor 370 can also be any device capable of sending and receiving control signals and data.

Processor 370 instructs lawnmower 310 to move from a reference point along the boundary wire and to follow the boundary wire along a boundary path back to the reference point using data from at least one wire sensor 350. Processor 370 determines one or more elements along the boundary path using distance data from at least one distance sensor 330 and angular velocity data from at least one direction sensor 330. Processor 370 identifies the one or more elements as one of at least three different types of elements. Finally, processor 370 calculates the mowing area from the identified types of the one or more elements and the distance data and angular velocity data received for the one or more elements.

In various embodiments, at least one distance sensor 330 includes an odometer. In various alternative embodiments, at least one distance sensor 330 can be, but is not limited to, at least one tachometer on a wheel of the lawnmower or a GPS device.

In various embodiments, at least one direction sensor 360 includes a gyroscope. In various alternative embodiments, at least one direction sensor 360 can be, but is not limited to, a compass or a GPS device.

In various embodiments, the reference point includes a docking or charging station connected to the boundary wire.

In various embodiments, the at least three different types of elements include a line, a node, and a curve. A line has directional change with respect to distance that is below a line threshold. A curve has directional change with respect to distance that a monotonic, continuous, and above a curve threshold. A node has an abrupt directional change with respect to distance that is above a node threshold.

In various embodiments, processor 370 further selects one or more mowing starting points along the boundary path and instructs lawnmower 310 to move to a starting point of the one or more mowing starting points and to begin mowing.

In various embodiments, processor 370 selects the one or more mowing starting points based on a size of the boundary path, a geometry of the boundary path, a previous mowing path stored in a memory of the lawnmower, or randomly.

In various embodiments, processor 370 adds a random distance factor to the starting point to prevent mowing from the same spot every time.

In various embodiments, processor 370 further instructs lawnmower 310 to mow from the starting point using a mowing pattern followed by random pattern mowing.

In various embodiments, the mowing pattern includes a parallel mowing pattern.

In various embodiments, processor 370 further calculates lateral drift and directional error produced by direction sensor 360 and instructs lawnmower 360 to adjust a turning radius of a pattern of the parallel mowing pattern.

Method for Calculating a Mowing Area

Figure 37:
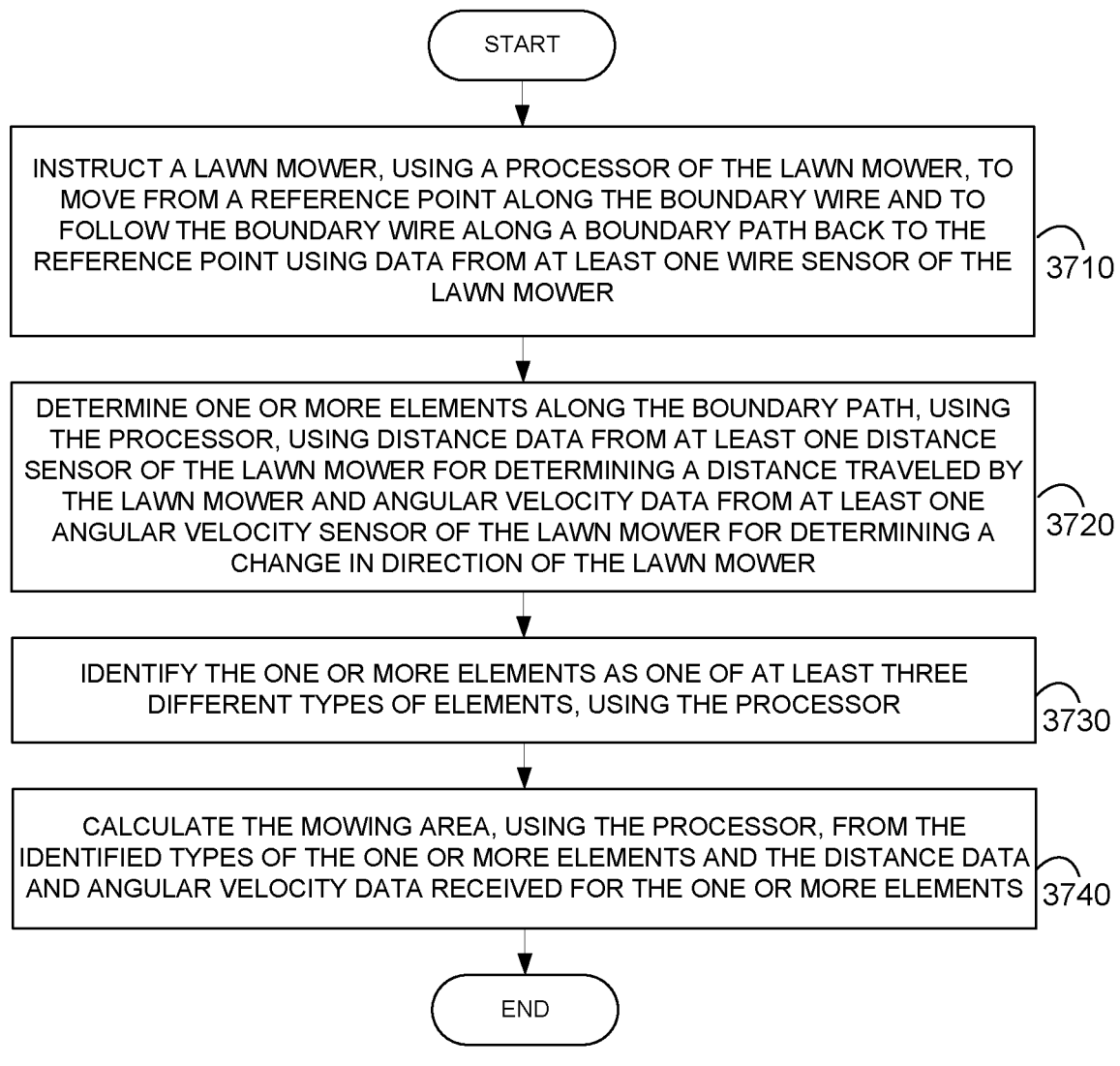
FIG. 37 is an exemplary flowchart showing a method for calculating a mowing area of a lawn delimited by a boundary wire, in accordance with various embodiments.

FIG. 37 is an exemplary flowchart showing a method 3700 for calculating a mowing area of a lawn delimited by a boundary wire, in accordance with various embodiments.

In step 3710 of method 3700, using a processor of a lawnmower, the lawnmower is instructed to move from a reference point along the boundary wire and to follow the boundary wire along a boundary path back to the reference point. The processor uses data from at least one wire sensor of the lawnmower.

In step 3720, using the processor, one or more elements are determined along the boundary path from distance data and angular velocity data. The processor uses distance data from at least one distance sensor of the lawnmower for determining a distance traveled by the lawnmower. The processor uses angular velocity data from at least one direction sensor of the lawnmower for determining a change in direction of the lawnmower.

In step 3730, the one or more elements are identified as one of at least three different types of elements, using the processor.

Finally, in step 3740, the mowing area is calculated, using the processor, from the identified types of the one or more elements and the distance data and angular velocity data received for the one or more elements.

Computer Program Product for Calculating a Mowing Area

In various embodiments, a computer program product includes a non-transitory tangible computer-readable storage medium whose contents include a program with instructions being executed on a processor so as to perform a method for calculating a mowing area of a lawn delimited by a boundary wire. This method is performed by a system that includes one or more distinct software modules.

Figure 38:
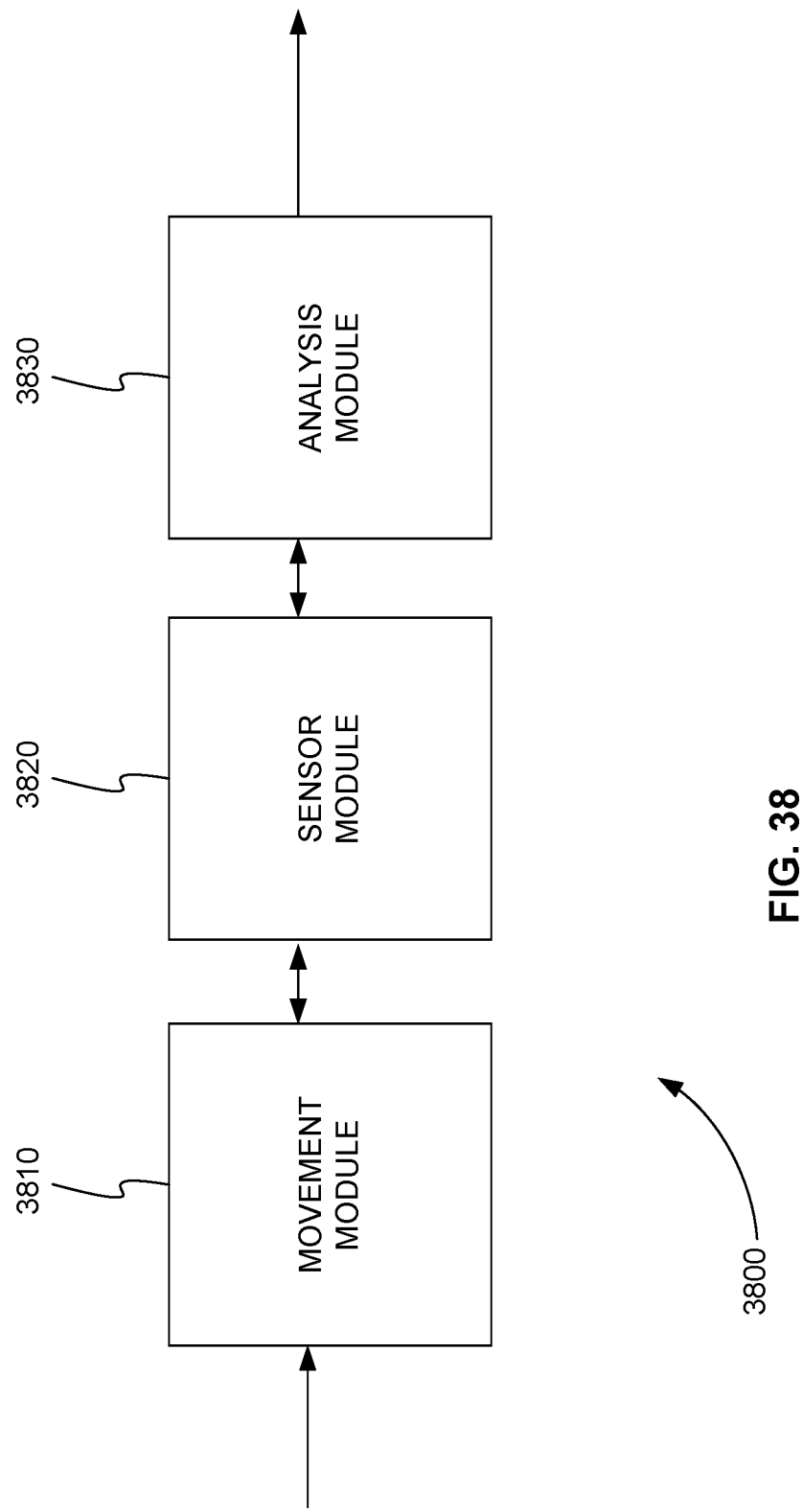
FIG. 38 is an exemplary schematic diagram of a system that includes one or more distinct software modules and that performs a method for calculating a mowing area of a lawn delimited by a boundary, in accordance with various embodiments.

FIG. 38 is an exemplary schematic diagram of a system 3800 that includes one or more distinct software modules and that performs a method for calculating a mowing area of a lawn delimited by a boundary, in accordance with various embodiments. System 3800 includes movement module 3810, sensor module 3820, and analysis module 3830.

Movement module 3810 instructs a lawnmower to move from a reference point along the boundary wire and to follow the boundary wire along a boundary path back to the reference point. Movement module 3810 uses data from at least one wire sensor of the lawnmower.

Sensor module 3820 determines one or more elements along the boundary path. Sensor module 3820 uses distance data from at least one distance sensor of the lawnmower for determining a distance traveled by the lawnmower. Sensor module 3820 also uses angular velocity data from at least one direction sensor of the lawnmower for determining a change in direction of the lawnmower.

Analysis module 3830 identifies the one or more elements as one of at least three different types of elements. Analysis module 3830 calculates the mowing area from the identified types of the one or more elements and the distance data and angular velocity data received for the one or more elements.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A lawnmower for calculating a mowing area of a lawn delimited by a boundary wire, comprising:
    at least one boundary wire sensor for detecting the boundary wire;
    at least one distance sensor for determining a distance traveled by the lawnmower;
    at least one direction sensor for determining a change in direction of the lawnmower; and
    at least one processor,
        wherein the processor instructs the lawnmower to move from a reference point along the boundary wire and to follow the boundary wire along a boundary path back to the reference point using data from the at least one boundary wire sensor,
        wherein the processor determines one or more elements along the boundary path using distance data from the at least one distance sensor and angular velocity data from the at least one direction sensor,
        wherein the processor identifies the one or more elements as one of at least three different types of elements, and
        wherein the processor calculates the mowing area from the identified types of the one or more elements and the distance data and angular velocity data received for the one or more elements.

2. The lawnmower of claim 1, wherein the at least one distance sensor comprises an odometer.

3. The lawnmower of claim 1, wherein the at least one distance sensor comprises at least one tachometer on a wheel of the lawnmower or a global positioning system (GPS) device.

4. The lawnmower of claim 1, wherein the at least one direction sensor comprises a gyroscope.

5. The lawnmower of claim 1, wherein the at least one direction sensor comprises a compass or a global positioning system (GPS) device.

6. The lawnmower of claim 1, wherein the reference point comprises a docking or charging station connected to the boundary wire.

7. The lawnmower of claim 1, wherein the at least three different types of elements comprise a line, a node, and a curve, wherein a line has directional change with respect to distance that is below a line threshold, wherein a node has an abrupt directional change with respect to distance that is above a node threshold.

8. The lawnmower of claim 1, wherein the processor further selects one or more mowing starting points along the boundary path and instructs the lawnmower to move to a starting point of the one or more mowing starting points and to begin mowing.

9. The lawnmower of claim 8, wherein the processor selects the one or more mowing starting points based on a size of the boundary path, a geometry of the boundary path, a previous mowing path stored in a memory of the lawnmower, or randomly.

10. The lawnmower of claim 8, wherein the processor adds a random distance factor to the starting point to prevent mowing from the same spot every time.

11. The lawnmower of claim 8, wherein the processor further instructs the lawnmower to mow from the starting point using a mowing pattern followed by random pattern mowing.

12. The lawnmower of claim 11, wherein the mowing pattern comprises a parallel mowing pattern.

13. The lawnmower of claim 12, wherein the processor further calculates lateral drift and directional error produced by the direction sensor and instructs the lawnmower to adjust a turning radius of a pattern of the parallel mowing pattern.

14. The lawnmower of claim 13, wherein the processor further changes an orientation of the parallel mowing pattern in a next mowing cycle.

15. A method for calculating a mowing area of a lawn delimited by a boundary wire, comprising:
    instructing a lawnmower, using a processor of the lawnmower, to move from a reference point along the boundary wire and to follow the boundary wire along a boundary path back to the reference point using data from at least one boundary wire sensor of the lawnmower;
    determining one or more elements along the boundary path, using the processor, using distance data from at least one distance sensor of the lawnmower for determining a distance traveled by the lawnmower and angular velocity data from at least one direction sensor of the lawnmower for determining a change in direction of the lawnmower;

identifying the one or more elements as one of at least three different types of elements, using the processor; and calculating the mowing area, using the processor, from the identified types of the one or more elements and the distance data and angular velocity data received for the one or more elements.

16. A computer program product, comprising a non-transitory tangible computer-readable storage medium whose contents cause a processor to perform a method for calculating a mowing area of a lawn delimited by a boundary wire, comprising:

providing a system, wherein the system comprises one or more distinct software modules, and wherein the distinct software modules comprise a movement module, a sensor module, and an analysis module;

instructing a lawnmower, using the movement module, to move from a reference point along the boundary wire and to follow the boundary wire along a boundary path back to the reference point using data from at least one boundary wire sensor of the lawnmower;

determining one or more elements along the boundary path, using the sensor module, using distance data from at least one distance sensor of the lawnmower for determining a distance traveled by the lawnmower and angular velocity data from at least one direction sensor of the lawnmower for determining a change in direction of the lawnmower;

identifying the one or more elements as one of at least three different types of elements, using the analysis module; and calculating the mowing area, using the analysis module, from the identified types of the one or more elements and the distance data and angular velocity data received for the one or more elements.

\* \* \* \* \*